United States Patent
Zhang et al.

(10) Patent No.: US 9,894,676 B2
(45) Date of Patent: **\*Feb. 13, 2018**

(54) COEXISTENT WORKING MODE ESTABLISHMENT METHOD, USER EQUIPMENT, BASE STATION AND SYSTEM

(71) Applicant: FUJITSU LIMITED, Kawasaki-shi, Kanagawa (JP)

(72) Inventors: Lei Zhang, Beijing (CN); Xin Wang, Beijing (CN); Yuantao Zhang, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/407,997

(22) Filed: Jan. 17, 2017

(65) Prior Publication Data

US 2017/0127437 A1 May 4, 2017

Related U.S. Application Data

(63) Continuation of application No. 14/981,069, filed on Dec. 28, 2015, now Pat. No. 9,565,569, which is a
(Continued)

(51) Int. Cl.
*H04W 72/12* (2009.01)
*H04W 88/06* (2009.01)

(52) U.S. Cl.
CPC ........ *H04W 72/1215* (2013.01); *H04W 88/06* (2013.01)

(58) Field of Classification Search
CPC .............................. H04L 12/28; H04W 16/14
See application file for complete search history.

(56) References Cited

U.S. PATENT DOCUMENTS

| 6,130,886 A | 10/2000 | Ketseoglou et al. |
| 2007/0224988 A1 | 9/2007 | Shaheen |

(Continued)

FOREIGN PATENT DOCUMENTS

| CN | 101668332 | 3/2010 |
| CN | 101815334 | 8/2010 |

(Continued)

OTHER PUBLICATIONS

3GPP TSG RAN WG2 meeting #70 bis Title: Dicsussion on In-device Co-existence Inerference Avoidance Jun. 28-Jul. 2, 2010 Source: Media Tek.*

(Continued)

*Primary Examiner* — Andrew Lai
*Assistant Examiner* — Leon Andrews
(74) *Attorney, Agent, or Firm* — Myers Wolin, LLC

(57) ABSTRACT

The present invention discloses a user equipment that communicates with a base station in a first communication system, includes a transmitter configured to transmit to the base station an indication to report a co-existence problem experienced by the user equipment and assistance information for a co-existence working mode in which the user equipment performs a first communication with the base station and performs a second communication with an apparatus in a second communication system; a receiver configured to receive from the base station configuration information that include information of a co-existence working mode allowed to be utilized by the user equipment and information that indicates whether the user equipment can deny an uplink transmission of the first communication system and a message; and a processor configured to configure the co-existence working mode according to the configuration information.

1 Claim, 7 Drawing Sheets

Related U.S. Application Data continuation of application No. 13/850,816, filed on Mar. 26, 2013, now Pat. No. 9,369,878, which is a continuation of application No. PCT/CN2010/077411, filed on Sep. 28, 2010.

(56) References Cited

U.S. PATENT DOCUMENTS

| | | | |
|---|---|---|---|
| 2009/0088177 | A1 | 4/2009 | Yang et al. |
| 2009/0164610 | A1 | 6/2009 | Lampe et al. |
| 2010/0056136 | A1 | 3/2010 | Zhu |
| 2010/0135256 | A1 | 6/2010 | Lee et al. |
| 2010/0203832 | A1 | 8/2010 | Russell et al. |
| 2014/0185555 | A1 | 7/2014 | Nakao et al. |

FOREIGN PATENT DOCUMENTS

| | | |
|---|---|---|
| CN | 101841880 | 9/2010 |
| EP | 1608108 | 12/2002 |
| JP | 2011-523521 A | 8/2011 |
| JP | 2012-501570 A | 1/2012 |
| JP | 2013-514543 A | 4/2013 |
| JP | 2013-523483 A | 6/2013 |
| KR | 10-2010-0028453 A | 3/2010 |
| RU | 2008 142 103 A | 4/2010 |
| WO | 2009/127690 A1 | 10/2009 |
| WO | 2010/002219 A2 | 1/2010 |
| WO | 2010/027208 A2 | 3/2010 |
| WO | 2010/103841 A1 | 9/2010 |
| WO | 2011/157235 A1 | 12/2011 |
| WO | 2012/019561 A1 | 2/2012 |

OTHER PUBLICATIONS

LG Electronics Inc KR 20100028453 Title: Method for Communication Time Allocation of Multiple Radio Mar. 12, 2010 Inventor: Jin Lee et al.*

Notice of Preliminary Rejection issued for corresponding Korean Patent Application No. 10-2013-7010906, dated Mar. 27, 2014, with an English translation.

Mediatek, "Discussion on In-device Coexistence Interference Avoidance", Agenda Item: 7.6, Jun. 28-Jul. 2, 2010, R2-103644, 3GPP TSG-RAN WG2 Meeting #70bis, 3GPP, Stockholm, Sweden, <URL:http://www.3gpp.org/ftp/tsg_ran/WG2_RL2/TSGR2_70bis/Docs/R2-103644.zip>.

Mediatek, "Analysis in In-Device Coexistence Interference Avoidance", Agenda Item: 7.6, Aug. 23-27, 2010, R2-104444, 3GPP TSG RAN WG2 #71, R2-104444, 3GPP, Madrid, Spain, <URL:http://www.3gpp.org/ftp/tsg_ran/WG2_RL2/TSGR2_71/Docs/R2-104444.zip>.

Zte, "Modelling of interference avoidance for in-device coexistence", Agenda Item: 7.6, Aug. 23-27, 2010, R2-104640, 3GPP TSG-RAN WG2 Meeting #71, Madrid, Spain, <URL:http://www.3gpp.org/ftp/tsg_ran/WG2_RL2/TSGR2_71/Docs/R2-104640.zip>.

Notice of Reason for Refusal issued for corresponding Japanese Patent Application No. 2013-530517, dated May 20, 2014, with an English translation.

Office Action issued for corresponding Mexican Patent Application No. MX/a/2013/003539, dated Jun. 16, 2014, with an English translation.

Report of Pre-Appeal Review issued for corresponding Japanese Patent Application No. 2013-530517 dated Feb. 24, 2015 with an English translation.

Office Action issued for corresponding Japanese Patent Application No. 2015-008830 dated Nov. 4, 2015 with an English translation.

Office Action issued for corresponding Russian Patent Application No. 2013113754, dated Sep. 1, 2014,with an English translation.

Office Action issued by the Canadian Intellectual Property Office for corresponding Canadian Patent Application No. 2,812,830 dated Mar. 23, 2015.

Office Action issued for corresponding Mexican Patent Application No. MX/a/2015/002042 dated Jun. 26, 2015 with an English translation.

Notice of Reason for Refusal issued for corresponding Japanese Patent Application No. 2013-530517, dated Feb. 12, 2014, with an English translation.

Non-Final Office Action issued by the United States Patent and Trademark Office for corresponding U.S. Appl. No. 13/850,816, dated Mar. 12, 2015.

3GPP TSG-RAN WG2 Meeting #70bis, Title: Discussion on In-device Coexistence Interface Avoidance, Source: Media Tek, Date: Jun. 28-Jul. 2, 2010.

Title: Method for Communication Time Allocation of Multiple Radio, Inventors: Jin Lee, Yong Ho Kim [KR], Applicant: LG Electronics Inc, Date: Mar. 12, 2010.

International Search Report issued for corresponding International Patent Application No. PCT/CN2010/077411, dated Jul. 7, 2011 with an English translation.

Notice of Preliminary Rejection issued for corresponding Korean Patent Application No. 10-2013-7010906, dated Oct. 20, 2014, with English translation.

Notification of the First Office Action issued for corresponding Chinese Patent Application No. 201080069305.8, dated Mar. 13, 2015, with an English translation.

European Search Report issued by European Patent Office dated Nov. 23, 2015 for corresponding patent application No. 10857670.3.

Office Action issued by Rospatent Federal Service for Intellectual Property for corresponding Russian Patent Application No. 2015120058/08(031022), dated Jun. 29, 2016, with an English translation.

Non-Final Office Action issued by the United States Patent and Trademark Office for corresponding U.S. Appl. No. 14/981,069, dated Aug. 18, 2016.

3GPP TSG-RAN WG2 #70bis, Title: Discussion on In-device Coexistence Interference Avoidance Source: Media Tek Date: Jun. 2, 2010.

Title: Method for Communication Time Avocation of Multiple Radio Inventors: Jin Lee, Yong Ho Kim[KR] Date: Mar. 12, 2010.

* cited by examiner

COEXISTENT WORKING MODE ESTABLISHMENT METHOD, USER EQUIPMENT, BASE STATION AND SYSTEM

CROSS-REFERENCE TO RELATED APPLICATIONS

The present application is a continuation of U.S. application Ser. No. 14/981,069, filed Dec. 28, 2015, now U.S. Pat. No. 9,565,569, which is a continuation of U.S. application Ser. No. 13/850,816, filed Mar. 26, 2013, now U.S. Pat. No. 9,369,878, issued Jun. 14, 2016, which is a continuation of PCT Application No. PCT/CN2010/077411, filed on Sep. 28, 2010, the contents of which are herein wholly incorporated by reference

FIELD OF THE INVENTION

The disclosure relates to a wireless communication field, in particular to a method for establishing a co-existence working mode in which a user equipment in a first communication system performs a first communication with a base station in the first communication system and performs a second communication with an apparatus in a second communication system which is different from the first communication system in a time-division manner, and a base station, a user equipment and a system which use this method.

BACKGROUND OF THE INVENTION

As the rapid development of wireless communication system, a user equipment such as a mobile phone and the like (also referred to terminal apparatus) plays a more and more important role in people's living. Functions other than the communication function in the user equipment, for example, access to a WLAN (Wireless Local Area Network) by utilizing the user equipment, have been used more and more. In addition, in order to facilitate the communication link and data exchange performed by the user equipment and another apparatus, interfaces such as infrared, Bluetooth, USE and the like have been becoming standard configurations of the user equipment. In particular, a Bluetooth earphone has been used more and more widely. The WLAN system, the Bluetooth system and the like all work in the ISM (Industrial, Scientific and Medical) frequency band. For example, the frequency band of 2400 MHz-2483.5 MHz is one of the international general ISM frequency bands, and is also one of the most common ISM frequency bands.

In case that the frequency band on which the communication between the user equipment and a corresponding base station is based is close to or a multiple of the frequency band on which the communication between the user equipment and another apparatus is based, such two communications may interfere with each other. For example, the wireless communication system LTE (Long Term Evolution) system is one of the super 3G (Beyond IMT-2000) systems. According to the LTE series standards [36.101], LTE system may work in several frequency bands. In these LTE working frequency bands, some frequency bands are immediately adjacent to the ISM frequency bands, such as the frequency band 40 for deploying a LTE TDD (Time Division Duplexing) system, 2300 MHz-2400 MHz; and the frequency band 7 for deploying a LTE FDD (Frequency Division Duplexing) system, 2500 MHz-2570 MHz for uplink and 2620 MHz-2670 MHz for downlink. In these LTE frequency bands, multiples of some frequency bands are also adjacent to the GPS (Global Positioning System) system, such as the frequency band 13 for deploying a LTE FDD system, 777 MHz-787 MHz for uplink and 746 MHz-756 MHz for downlink; and the frequency band 14 for deploying a LTE FDD system, 788 MHz-798 MHz for uplink and 758 MHz-768 MHz for downlink. If a LTE user equipment works in above frequency bands while the WLAN system or the Bluetooth system on the user equipment is at activated status, the LTE system and the ISM system (WLAN system, the Bluetooth system and the like) in the user equipment may interfere with each other due to adjacent frequency band leakage, and even result in communication failure due to an extremely high code error rate. If the GPS system on the user equipment is activated at the same time, the GPS system may be interfered with by the LTE system and can not work normally.

The conventional method for solving such issue is to employ higher performance transmitting filter in the transmitting terminal of the user equipment which communicates with the base station and/or in the transmitting terminal of the user equipment which communicates with another apparatus to reduce the adjacent frequency band leakage and/or suppress the harmonic frequency interference. The disadvantage is that such method may largely increase the cost of the user equipment.

SUMMARY OF THE INVENTION

Some embodiments of the disclosure provide a method for establishing a co-existence working mode, by which a co-existence working mode in which a user equipment in a first communication system performs a first communication with a base station in the first communication system and performs a second communication with an apparatus in a second communication system which is different from the first communication system in a time-division manner can be established quickly. Some embodiments of the disclosure also provide a base station, a user equipment and a system which use this method.

According to an aspect of the disclosure, it is provided a method for establishing a co-existence working mode comprising: receiving, by a base station of a first communication system from a user equipment in the first communication system, a mode establishing request for requesting to establish a co-existence working mode; encapsulating configuration information of a co-existence working mode allowed to be utilized by the user equipment in an establishing response message; transmitting the establishing response message to the user equipment; and receiving a message indicating whether configuration of the co-existence working mode has been completed fed back from the user equipment.

According to another aspect of the disclosure, it is provided a method for establishing a co-existence working mode comprising: transmitting, by a user equipment of a first communication system to a base station in the first communication system, a mode establishing request for requesting to establish a co-existence working mode; receiving an establishing response message comprising configuration information of a co-existence working mode allowed to be utilized by the user equipment fed back from the user equipment; configuring the co-existence working mode according to the configuration information; and feeding back a message indicating whether configuration of the co-existence working mode has been completed to the base station.

According to another aspect of the disclosure, it is provided a base station. The base station is configured in a first communication system and comprises: a receiving device for receiving, from a user equipment in the first communication system, a mode establishing request for requesting to establish a co-existence working mode; a control device for encapsulating configuration information of a co-existence working mode allowed to be utilized by the user equipment in an establishing response message; and a transmitting device for transmitting the establishing response message to the user equipment. The receiving device is further used to receive a message indicating whether configuration of the co-existence working mode has been completed fed back from the user equipment.

According to another aspect of the disclosure, it is provided a user equipment. The user equipment is configured in a first communication system and comprises: an information processing device for generating a mode establishing request for requesting to establish a co-existence working mode; a transmitting device for transmitting the mode establishing request to a base station in the first communication system; and a receiving device for receiving an establishing response message comprising configuration information of a co-existence working mode allowed to be utilized by the user equipment fed back from the base station, wherein the information processing device is further used to configure the co-existence working mode according to the configuration information. The transmitting device is further used to feed back a message indicating whether configuration of the co-existence working mode has been completed to the base station.

According to another aspect of the disclosure, it is provided a communication system comprising the base station and the user equipment as described above.

In addition, the embodiments of the disclosure also provide a computer program for achieving the methods as described above.

According to another aspect of the disclosure, it is provided a user equipment configured in a first communication system, comprising: a receiver configured to receive pre-configured information for co-existence working mode from a base station in the first communication system; a processor configured to generate a mode establishing request for indicating a co-existence problem experienced by the user equipment and providing assistance information for co-existence working mode in which the user equipment performs a first communication with the base station of the first communication system and performs a second communication with an apparatus in a second communication system which is different from the first communication system; and a transmitter configured to transmit the mode establishing request to the base station in the first communication system; and wherein the receiver is further configured to receive, from the base station, an establishing response message comprising configuration information of a co-existence working mode allowed to be utilized by the user equipment, the processor is further configured to configure the co-existence working mode according to the configuration information, and the transmitter is further configured to feedback, to the base station, a message indicating whether configuration of the co-existence working mode has been completed, and wherein the pre-configured information of the co-existence working mode indicates whether the user equipment can deny uplink transmission of the first communication system.

According to another aspect of the disclosure, it is provided a communication system, comprising: a base station including a control device, configured to pre-configure information for co-existence working mode, and a receiving device, configured to receive, from a user equipment in a first communication system, a mode establishing request for indicating a co-existence problem experienced by the user equipment and providing assistance information for co-existence working mode in which the user equipment performs a first communication with the base station and performs a second communication with an apparatus in a second communication system which is different from the first communication system, a control device, configured to encapsulate configuration information of a co-existence working mode allowed to be utilized by the user equipment into an establishing response message, and a transmitting device, configured to transmit the pre-configured information for co-existence working mode and the establishing response message to the user equipment, wherein the receiving device is further configured to receive a message indicating whether configuration of the co-existence working mode has been completed fed back from the user equipment, and wherein the pre-configured information of the co-existence working mode indicates whether the user equipment can deny uplink transmission of the first communication system; and the user equipment including a receiving device, configured to receive the pre-configured information for co-existence working mode from the base station in the first communication system, a information processing device, configured to generate a mode establishing request for indicating the co-existence problem experienced by the user equipment and providing the assistance information for the co-existence working mode in which the user equipment performs a first communication with a base station of the first communication system and performs a second communication with the apparatus in the second communication system which is different from the first communication system, and a transmitting device, configured to transmit the mode establishing request to the base station in the first communication system.

In addition, the embodiments of the disclosure also provide a computer program product at least in a form of computer readable medium on which a computer program code for achieving the methods as described above is recorded.

BRIEF DESCRIPTION OF THE DRAWINGS

The above and other objects, features and advantages of the disclosure may be understood more easily by referring to description of the embodiments of the disclosure in conjunction with the Drawings. Components in the Drawings are not drawn in ratio, and are only for illustrating principle of the disclosure. To show and describe some portions of the disclosure, corresponding sections in the Drawings may be enlarged, that is, corresponding sections are made larger than other components in the example device actually manufactured according to the disclosure. In the Drawings, the same or similar technical feature or component is represented by the same or similar reference sign.

DETAILED DESCRIPTION OF THE INVENTION

Figure 1:
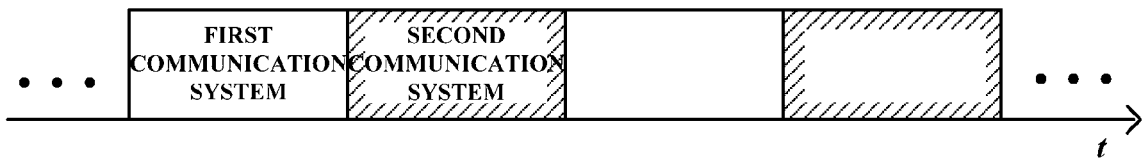
FIG. 1 is a schematic diagram illustrating the situation of performing a first communication of a user equipment with a base station and a second communication of the user equipment with another apparatus in a time-division manner.

The embodiments of the present disclosure are discussed hereinafter in conjunction with the Drawings. Elements and features described in one Drawing or one embodiment of the present disclosure may be combined with elements and features described in one or more other Drawings or embodiments. It shall be noted that representation and description of components and processes unrelated to the present disclosure and well known to one of ordinary skill in the art are omitted in the Drawings and the Description for the purpose of clearness.

In a user equipment of a wireless communication system, there may be two communications performed simultaneously, in which one is the communication performed between the user equipment and a base station (for the purpose of convenience, hereinafter this communication is referred to first communication, and this communication system is referred to main communication system or first communication system), and the other is the communication performed between the user equipment and another apparatus (for example, an AP (Access Point) of a WLAN system, an apparatus of a Bluetooth system, an apparatus of a GPS system or the like) (for the purpose of convenience, hereinafter this communication is referred to second communication, and the related communication system is referred to interfering system or second communication system). The frequency bands in which the first communication system and the second communication system work may be adjacent to each other or have a multiple relationship (such as LTE communication system and ISM communication system, LTE communication system and GPS communication system, and the like). In this case, there is a situation that these two communication systems interfere with each other due to adjacent channel leakage and/or harmonic frequency interference.

The inventor of the disclosure has recognized that the first communication and the second communication may be performed in a time-division manner in order to avoid such interference. FIG. 1 is a schematic diagram illustrating the situation of performing the first communication and the second communication in a time-division manner. As shown in FIG. 1, in time domain, the first communication system and the second communication system work in a time-division manner. In another words, in a time-division manner, in a period during which the user equipment performs the first communication with an apparatus of the first communication system, the second communication with an apparatus of the second communication system is inhibited, and vice versa. In the disclosure, the working mode in which two or more communication systems present on the same user equipment, that is, the user equipment performs the first communication with a base station in the first communication system and performs the second communication with an apparatus in at least one second communication system which is different from the first communication system by utilizing different time resources, is referred to co-existence working mode. According to specific types of the main communication system and the interfering system, a plurality of co-existence working modes may be set to apply to these types. For example, one or more co-existence working modes based on a time-division manner may be set, and these modes based on a time-division manner may have different time resource allocation schemes.

The embodiments of the disclosure disclose a method for establishing the co-existence working mode as described above, and a base station, a user equipment and a system which use this method.

Figure 2:
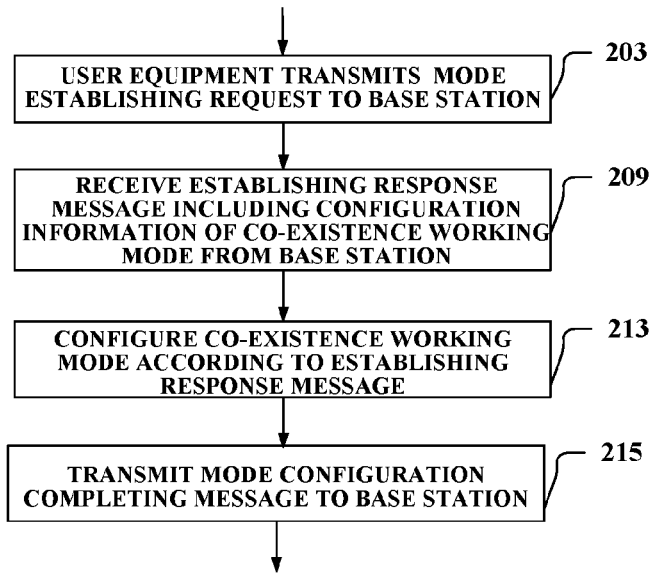
FIG. 2 is a flowchart illustrating a method for establishing a co-existence working mode by a user equipment in a first communication system according to an embodiment of the disclosure.

FIG. 2 illustrates a flow of a method for establishing the co-existence working mode by the user equipment in the first communication system according to an embodiment of the disclosure.

As shown in FIG. 2, the method may comprise steps 203, 209, 213, and 215.

Specifically, at step 203, the user equipment transmits a mode establishing request for entering the co-existence working mode to the base station when there is a need to enter the co-existence working mode (for example, the interfering system is detected). At step 209, the user equipment receives an establishing response message including configuration information of the co-existence working mode allowed to be entered by the user equipment fed back from the base station. Thereafter, at step 213, the user equipment configures the co-existence working mode according to the configuration information obtained by analyzing the establishing response message, that is, sets corresponding components (such as a device for performing the first communication and a device for performing the second communication) in the user equipment according to the configuration information. After completing the configuration of the co-existence working mode, the user equipment may feed back a configuration completing message indicating whether configuration of the co-existence working mode has been completed successfully to the base station (as shown in step 215). After completing the configuration of the co-existence working mode, the user equipment may report the configuration condition of the co-existence working mode to the base station, which may help the base station to fully understand the working state of the user equipment while may effectively avoid the occurrence of the situation that the user equipment fails to configure the co-existence working mode and the base station does not know this and start the co-existence working mode.

Figure 3:
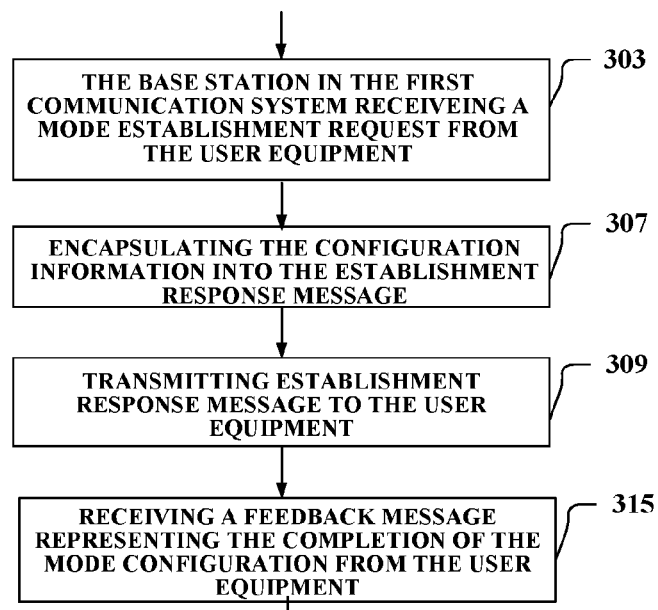
FIG. 3 is a flowchart illustrating a method for establishing the co-existence working mode by a base station in the first communication system, which corresponds to the method of FIG. 2, according to an embodiment of the disclosure.

FIG. 3 illustrates a flow of the method for establishing the co-existence working mode by a base station, which corresponds to the method of FIG. 2.

As shown in FIG. 3, the method may comprise steps 303, 307, 309, and 315.

Specifically, at step 303, the base station receives a mode establishing request for establishing the co-existence working mode transmitted from the user equipment. Thereafter, at step 307, the base station generates a response to the mode establishing request, which is referred to establishing response message, in which the configuration information of the co-existence working mode allowed to be utilized by the user equipment is encapsulated. At step 309, the base station transmits the establishing response message to the user equipment. At step 315, the base station receives a configuration completing message indicating whether configuration of the co-existence working mode has been completed successfully fed back from the user equipment, thereby understand whether the user equipment successfully completes the configuration of the co-existence working mode.

With the method shown in FIG. 2 or 3, when detecting an interfering system, the user equipment in the first communication system may enter the co-existence working mode quickly.

Figure 4:
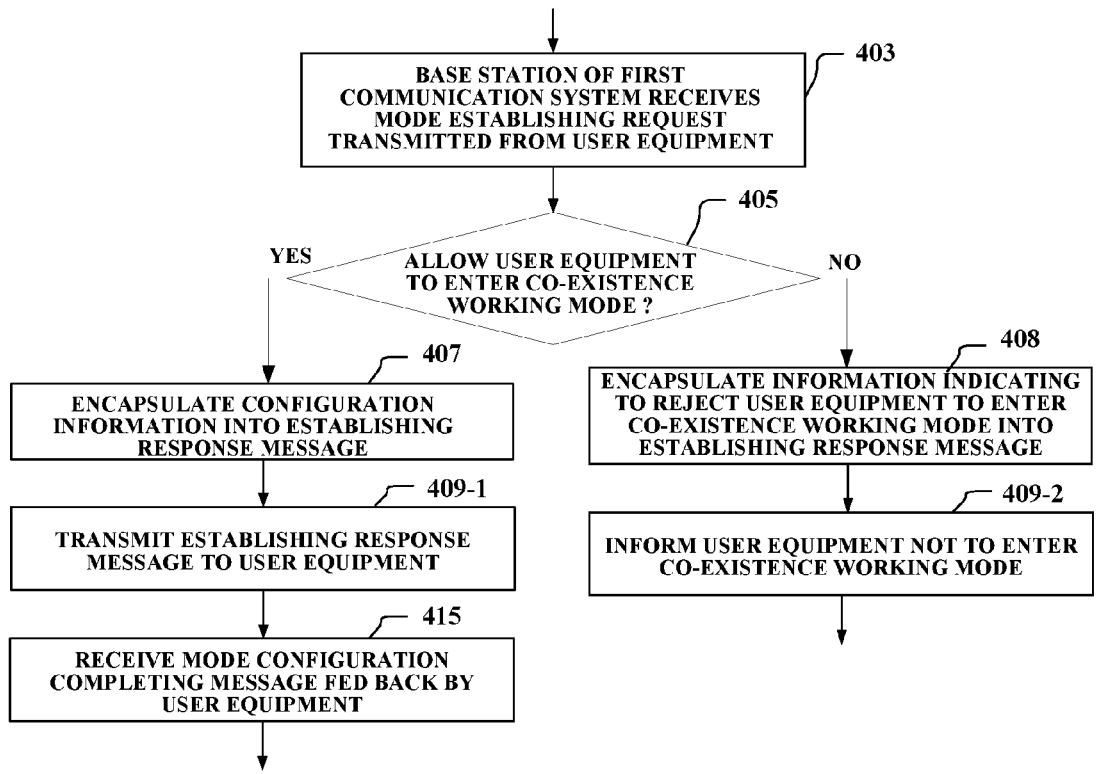
FIG. 4 is a flowchart illustrating a method for establishing the co-existence working mode by the base station in the first communication system according to another embodiment of the disclosure.

FIG. 4 illustrates a schematic flow of a method for establishing the co-existence working mode by the base station of the first communication system according to another embodiment of the disclosure. The method shown in FIG. 4 is different from the above embodiment in that after receiving the mode establishing request for establishing the co-existence working mode of the user equipment, the base station first judges whether to allow to enter the co-existence working mode according to current operation condition of the first communication network.

As shown in FIG. 4, the method begins at step 403. At step 403, the base station receives a mode establishing request for establishing the co-existence working mode transmitted from the user equipment. Thereafter, at step 405, the base station judges whether to allow to enter the co-existence working mode according to current operation condition of the system. For example, the base station may make the judgment according to operation condition of the current cell (such as current use condition of resources and the like) and working condition of the user equipment (such as current service of the user equipment and the like). If the base station judges that the user equipment is allowed to enter the co-existence working mode, the process proceeds to step 407, otherwise, the process turns to step 408.

At step 407, the base station generates a establishing response message, in which the configuration information of the co-existence working mode allowed to be utilized by the user equipment is encapsulated. At step 409-1, the base station transmits the establishing response message to the user equipment. At step 415, the base station receives a configuration completing message indicating whether configuration of the co-existence working mode has been completed fed back from the user equipment, thereby understand whether the user equipment completes the configuration of the co-existence working mode.

At step 408, the base station encapsulates information indicating to reject the user equipment to enter the co-existence working mode in the establishing response message, and then transmits it to the user equipment at step 409-2.

Figure 5:
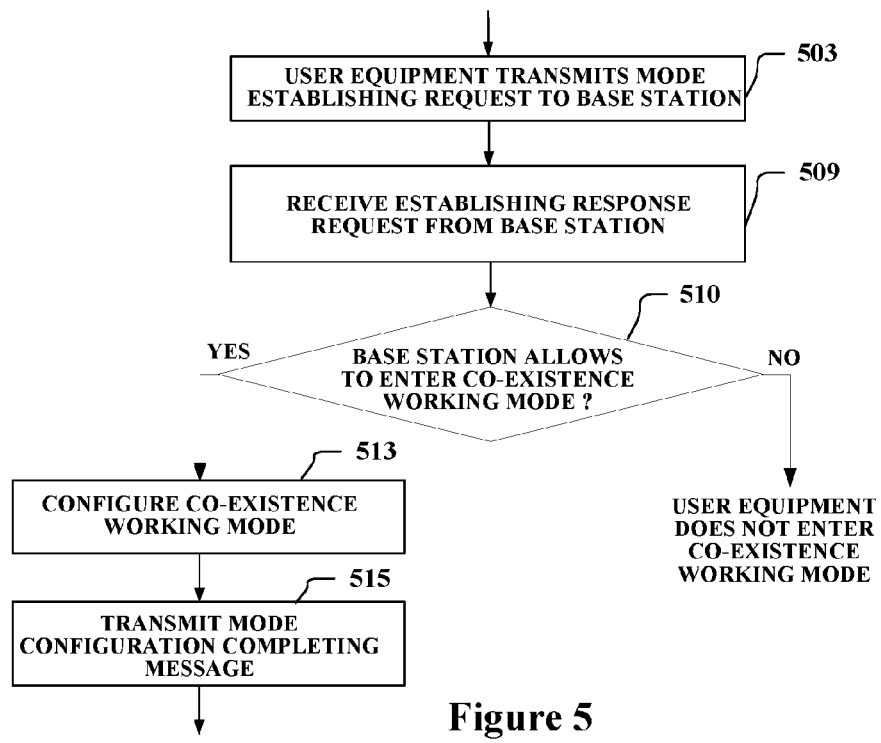
FIG. 5 is a flowchart illustrating a method for establishing the co-existence working mode by the user equipment in the first communication system, which corresponds to the method of FIG. 4, according to another embodiment of the disclosure.

FIG. 5 illustrates a schematic flow of a method for establishing the co-existence working mode by the user equipment which corresponds to the method of FIG. 4.

As shown in FIG. 5, the method begins at step 503. Step 503 is similar to step 403 shown in FIG. 4, that is, the user equipment transmits a mode establishing request for entering the co-existence working mode to the base station when there is a need to enter the co-existence working mode (for example, the interfering system is detected). At step 509, the user equipment receives an establishing response message fed back from the base station. Thereafter, at step 510, the user equipment analyses the establishing response message and judge whether it is allowed to enter the co-existence working mode according to the content of the response message. If the response message includes information indicating to reject the user equipment to enter the co-existence working mode as described above, the user equipment does not enter the co-existence working mode, otherwise, at step 513, the user equipment configures the co-existence working mode according to the configuration information obtained by analyzing the establishing response message, that is, sets corresponding components (such as a device for performing the first communication and a device for performing the second communication) in the user equipment according to the configuration information. After completing the configuration of the co-existence working mode, the user equipment may feed back a configuration completing message indicating whether configuration of the co-existence working mode has been completed successfully to the base station (as shown in step 515).

Compared with the method of FIG. 2 or 3, the method of FIG. 4 or 5 is relatively complex, and thus need more time to process. However, the base station may judge whether to enter the co-existence working mode according to actual operation condition of the system, and thus this method can guarantee the normal operation of the main communication system (that is, the first communication system).

As an example, the mode establishing request generated by the user equipment may only includes information for informing the base station that the user equipment needs to use the co-existence working mode. In this case, the mode establishing request may only includes 1 bit or more. After receiving the establish request, the base station may immediately understand that the user equipment needs to enter the co-existence working mode, thereby allow to feed back the configuration information of the co-existence working mode allowed to be utilized by the user equipment to the user equipment.

As another example, the mode establishing request may includes other information. For example, the user equipment may encapsulate information about type and/or service of the interfering system into the mode establishing request. For example, the user equipment may also select configuration information of co-existence working mode according to the interfering system and operation condition itself, and encapsulate information indicating configurations recommended to use into the mode establishing request. The co-existence working mode may be determined based on the information, which may help the base station to select the most applicable co-existence working mode for the interfering system while guarantee the normal operation of the main communication system. In these cases, the mode establishing request may include a plurality of bits. As a specific example, the mode establishing request may include one or more of the following information:

- type of the interfering system; such as information about whether the interfering system is a GPS system or an ISM system, which ISM system the interfering system is, and the like;
- service of the interfering system; using WLAN as an example, services such as web page browse, uploading and downloading, online game, and the like may need different time slot length and different frequency band; using Bluetooth earphone as an example, services such as talking, standby, music playing, and the like may also need different time slot length and different frequency band; the information may cause the base station to select and allocate the most applicable transmitting resource for the service;
- co-existence working mode recommended by the user equipment; for example, the user equipment may encapsulate the recommended configuration information into the mode establishing request; for example, if one or more co-existence working modes and configuration information for each co-existence working mode are set in the first communication system (for example, the information may be preset in the user equipment by manufacturer according to standards of the first communication system before delivery, or preset in the user equipment by network operator according to standards of the first communication system), the user equipment may encapsulate information of the selected co-existence working mode (such as sequence number) as indicated by user into the mode establishing request.

Figure 6A:
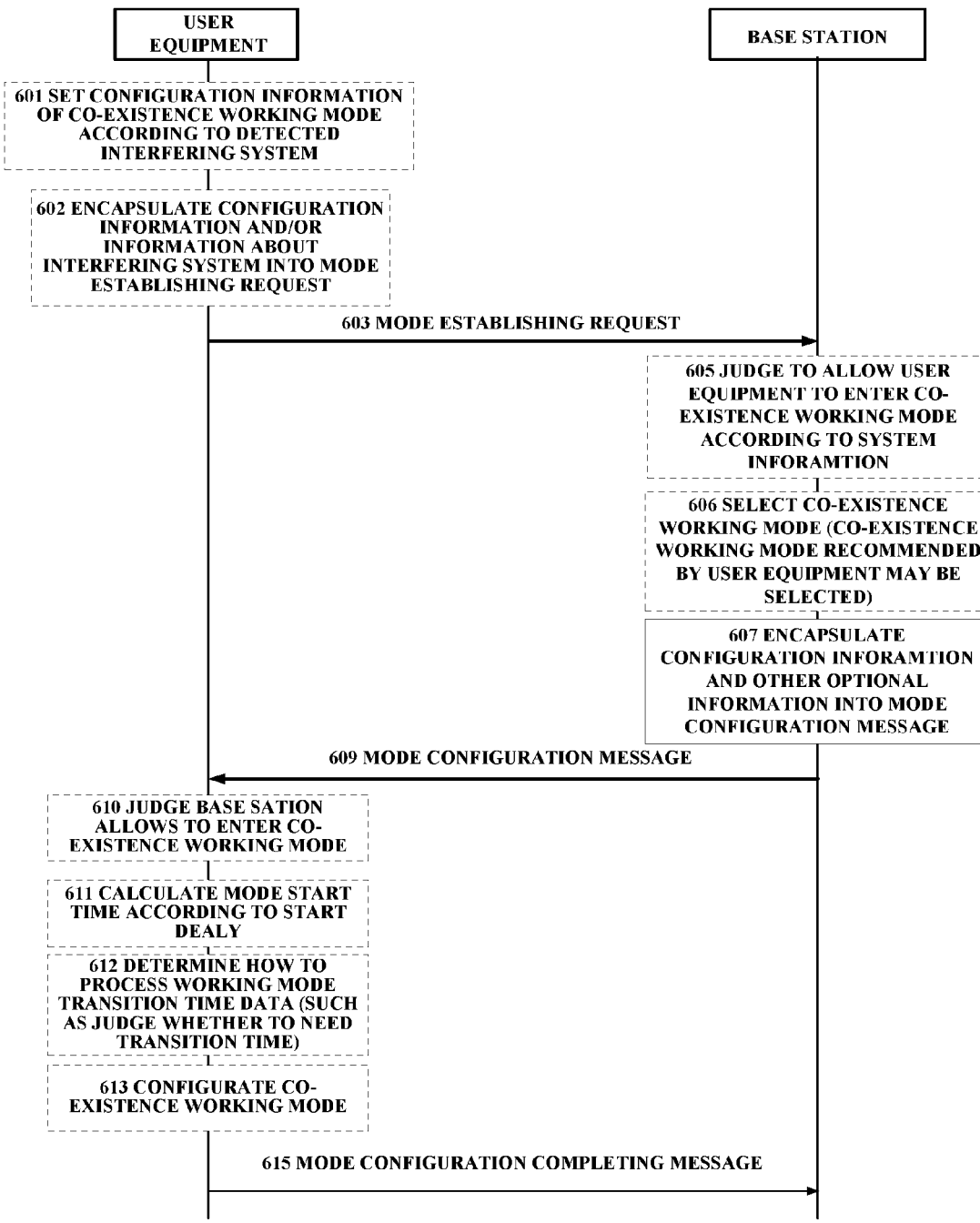
FIGS. 6A and 6B are schematic diagrams illustrating an example of the method for establishing the co-existence working mode according to the disclosure.
Figure 6B:
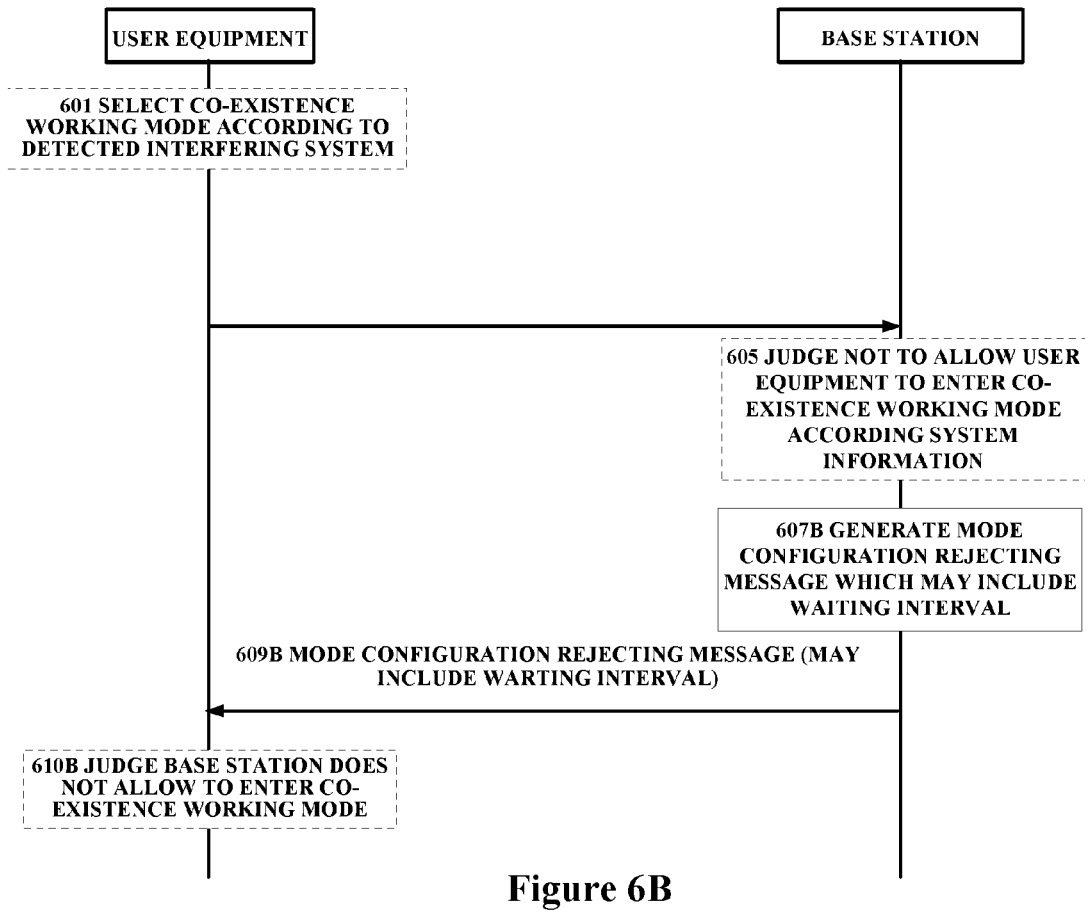

FIGS. 6A and 6B illustrate an example of establishing the co-existence working mode, in which FIG. 6A illustrates an information delivery and operation flow in case that the base station allows the user equipment to enter the co-existence working mode, while FIG. 6B illustrates an information delivery and operation flow in case that the base station rejects the user equipment to enter the co-existence working mode.

As shown in FIGS. 6A and 6B, at step 601, the user equipment detects that there is an interfering system, and determines to request for entering a co-existence working mode to the base station. In this example, the user equipment may select the co-existence working mode according to operation conditions of the interfering system and itself. Then at step 602 shown in FIGS. 6A and 6B, information about the co-existence working mode recommended by the user equipment (in case that the manufacturer of the user equipment or the operator of the first communication system presets one or more co-existence working modes in the user equipment, the information may be the sequence number of the co-existence working mode recommended by the user equipment. Or, the information may be recommended configuration information of the co-existence working mode) is encapsulated into a mode establishing request. The user equipment may also encapsulate information about a type and/or service of the interfering system and the like into the mode establishing request. Then the user equipment transmits the mode establishing request to the base station (step 603 shown in FIGS. 6A and 6B).

At step 605 shown in FIGS. 6A and 6B, the base station judges whether to allow the user equipment to enter a co-existence working mode according to operation condition of the first communication system (such as operation condition of the current cell (such as the current resource usage condition and the like) and working condition of the user equipment (such as the current service of the user equipment and the like) and the like). If the base station judges to allow the user equipment to enter the co-existence working mode (step 605 shown in FIG. 6A), the process proceeds to steps 606 and 607 shown in FIG. 6A, otherwise (step 605 shown in FIG. 6A), the process turns to step 607B shown in FIG. 6B.

Now referring to FIG. 6A, at steps 606 and 607, the base station selects a co-existence working mode for the user equipment and generates a mode configuration message. In case that the received mode establishing request includes a type and/or service of the interfering system, the base station may select an applicable co-existence working mode for the user equipment according to the type and/or service of the interfering system and the current operation condition of the system and service of the user equipment in the first communication system. In case that the received mode establishing request does not include a type and/or service of the interfering system, the base station may select an applicable co-existence working mode for the user equipment according to the current operation condition of the first communication system and service of the user equipment in the first communication system. In case that the mode establishing request includes a co-existence working mode recommended by the user equipment, the base station may judges whether the co-existence working mode recommended by the user equipment may be used according to the current operation condition of the system. If so, information indicating to allow the user equipment to use the mode recommended by itself is encapsulated into the mode configuration message; if not, the base station selects a co-existence working mode for the user equipment and encapsulates configuration information into the mode configuration message (step 607 shown in FIG. 6A). Then the base station transmits the mode configuration message to the user equipment (step 609 shown in FIG. 6A). The user equipment determines whether the base station allows it to enter a co-existence working mode according to the mode configuration message (step 610), and configures the co-existence working mode according to the configuration information as indicated in the message (step 613) to enter the co-existence working mode. After completing configuration of the co-existence working mode, the user equipment feeds back a mode configuration completing message indicating whether configuration of the co-existence working mode has been completed successfully to the base station (step 615). After receiving the mode configuration completing message, the base station may understand whether the user equipment has configured the configuration successfully.

As a specific example, the base station may also encapsulate information indicating a start delay of the co-existence working mode into the mode configuration message (step 607). The user equipment may determine the time to start the co-existence working mode according to the start delay and the time at which the user equipment transmits a confirmation signal (such as an ACK signal) indicating that the user equipment has received the mode configuration message successfully to the base station (step 611). The base station may determine the time to start the co-existence working mode according to the time of receiving a confirmation signal (such as an ACK signal) indicating that the user equipment has received the mode configuration message successfully fed back from the user equipment and the start delay (not shown). As another specific example, the user equipment may determine the time to start the coexistence working mode according to the start delay and the time at which the user equipment receives a confirmation signal (such as an ACK signal) indicating that the base station has received the mode configuration completing message successfully transmitted from the base station side. The base station may determine the time to start the co-existence working mode according to the time of transmitting a confirmation signal (such as an ACK signal) indicating that the base station has received the mode configuration completing message successfully transmitted to the user equipment and the start delay (not shown).

In conversion from a working mode to another working mode, after a new working mode starts, there may be data of previous working mode, transmission of which has been started but not been completed, and/or data of previous working mode, which has been scheduled (such as has been allocated with transmission resource) but transmission of which has not been started. For example, when entering the co-existence working mode, there may be uplink or downlink data of previous working mode, transmission of which has been started but not been completed, or information of previous working mode, which has been scheduled but not been transmitted. The previous working mode for transmitting the data and information may conflict with data transmission in the co-existence working mode (including data transmissions of the first communication system and the second communication system). As such, after terminating the co-existence working mode, there may also be some uplink or downlink data which has not been transmitted successfully and/or information which has been scheduled but not been transmitted and the like. If such data and information is still transmitted according to the timing relationship in the co-existence working mode after the co-existence working mode has been terminated, they may conflict with data and information transmitted in next working mode. For the purpose of simplicity, hereinafter the data (including information of original working mode which has been scheduled but not been transmitted and data of original working mode transmission of which has been started but not completed) is referred to "working mode transition time data", and some exemplary methods for processing this working mode transition period data will be given.

In a first exemplary method, after entering a new working mode, the remaining working mode transition time data of previous working mode is discarded, or transmission thereof is terminated. The data may be rescheduled and retransmitted according to the new working mode. For example, after entering a co-existence working mode, the transmission of information of the previous working mode which has been scheduled but not been transmitted is terminated, and data of the previous working mode transmission of which is in progress but not has been completed is discarded. After entering the co-existence working mode, the data may be rescheduled and retransmitted according to the co-existence working mode. As such, after terminating the co-existence working mode, the transmission of information of the co-existence working mode which has been scheduled but not been transmitted is terminated, and data of the co-existence working mode transmission of which is in progress but not has been completed is discarded. After switching to next working mode (such as a normal working mode or another co-existence working mode), the data may be rescheduled and retransmitted according to the normal working mode or the another co-existence working mode.

In a second exemplary method, after entering a new working mode, a transition time is set, in which transmission of the remaining working mode transition time data is completed according to previous working mode. For example, after entering a co-existence working mode, a transition time is set, in which the transmission of the remaining working mode transition time data is completed according to original working mode (such as a normal working mode). As such, after terminating the co-existence working mode, a transition time may also be set. When terminating the co-existence working mode (such as after switching to the normal working mode or entering another co-existence working mode), transmission of the working mode transition time data (including information of original working mode which has been scheduled but not been transmitted and data of original working mode transmission of which has been started but not been completed) is completed according to the original working mode (i.e., the original co-existence working mode). Both the transition time after entering the co-existence working mode and the transition time after terminating the co-existence working mode may be set at the same time, or, one of them may be separately set.

In a third exemplary method, after entering a new working mode, the transmission and/or retransmission of the remaining working mode transition time data is resumed with transmission resource in the new working mode. For example, time resource allocation in the new working mode may have a correspondence with that in previous working mode. In this case, after entering the new working mode, transmission of the data may not be terminated, and transmission or retransmission thereof may be conducted by utilizing time resource in the new working mode corresponding to that in the previous working mode. For example, after entering a co-existence working mode, transmission and retransmission of the working mode transition time data both are conducted according to control mapping relation of the time resource in the co-existence working mode. As such, after terminating the co-existence working mode, transmission and retransmission of the working mode transition time data both are conducted according to control mapping relation of the time resource in next working mode (a normal working mode or a another co-existence working mode).

In an example, the mode configuration message transmitted by the base station to the user equipment may also include information indicating method of processing the working mode transition time data. The information may indicate how to process the working mode transition time data, for example, may indicate which one of the above three methods will be used. The base station may encapsulate the information into the mode configuration message (step 607). After receiving the mode configuration message, the user equipment may determine method of processing the remaining working mode transition time data in previous working mode according to the configuration message (step 612), and process the working mode transition time data according to the method.

As a specific example, the mode configuration message transmitted by the base station to the user equipment may also include information about transition time of co-existence working mode (that is, the above second method is used, and the information is a specific example of the information indicating method of processing the working mode transition time data). Herein, the transition time of the co-existence working mode refers to the time of maintaining the previous working mode after entering the co-existence working mode and/or the time of maintaining the co-existence working mode after terminating the co-existence working mode. A transition time may be set for each co-existence working mode. For example, the information about a transition time of the co-existence working mode may include information indicating whether the co-existence working mode needs a transition time and/or information indicating applicable range of the transition time and/or length of the transition time. The information indicating the applicable range of the transition time is used to indicate that the transition time is applicable for transition time of entering the co-existence working or transition time of terminating the co-existence working mode or both. The base station may encapsulate the information about the transition time into the mode configuration message (step 607). After receiving the mode configuration message, the user equipment may judge whether the configured co-existence working mode uses a transition time, applicable range of the transition time, and the like (step 612). If there is a applicable transition time after entering the co-existence working mode (for the purpose of simplicity, referred to first transition time), after entering the co-existence working mode, the user equipment continues to transmit data using the previous working mode during the transition time after entering the co-existence working mode. Further, if there is a applicable transition time after terminating the co-existence working mode (for the purpose of simplicity, referred to second transition time), after terminating the co-existence working mode, the user equipment continues to transmit data using the previous working mode during the transition time after entering the co-existence working mode. As described above, the first transition time and the second transition time may have the same value or different values.

In a specific example, start delay of co-existence working mode may be indicated by a number of subframes. In another specific example, the start delay of the co-existence working mode may be indicated by a sequence number. For example, if a system previously specifies a plurality of delay values (i.e., the numbers of delay subframes) and numbers the delay values in a certain sequence (which is preset in the user equipment and the base station by the manufacturer or the operator), the base station may encapsulate sequence number of corresponding start delay into a establishing response message. After receiving the establishing response message, the user equipment may obtain the corresponding start delay.

The information indicating whether the co-existence working mode needs a transition time may be indicated by one or more bits. For example, when the information is indicated by one bit, bit 0 may indicate there is no need for a transition time, that is, after entering a co-existence working mode, all data transmissions which are not completed are directly terminated and wait to be reallocated or transmitted after entering the co-existence working mode; and bit 1 may indicated there is a need for a transition time. When the information is indicated by two bits, for example, one bit may indicate whether there is a need for a transition time before entering a co-existence working mode, and another bit may indicate whether there is a need for a transition time after receiving a command of terminating the co-existence working mode. Herein not all the cases will be listed.

The base station may select length of transition time of co-existence working mode according to operation condition of the system, which is not defined herein. In another example, the length of transition time may be indicated by one subframe. In this example, length of transition time after starting a co-existence working mode may equal to length of transition time after terminating the co-existence working mode. As another specific example, the length of transition time may be indicated by two subframes. That is, length of transition time after starting a co-existence working mode may not equal to length of transition time after terminating the co-existence working mode, both of which are indicated by two subframes respectively. In other specific examples, the length of transition time may be indicated by a sequence number. For example, if the system specifies several possible or common lengths of transition time (which are preset in the user equipment and the base station by the manufacturer or the operator) and numbers them in a certain sequence, the base station may encapsulate sequence number of a selected length into a establishing response message.

In a specific example, the establishing response message transmitted by the base station to the user equipment may include one or more of the following information:

start delay of co-existence working mode;
time cycle of co-existence working mode (including working time of the first communication and working time of the second communication);
ratio of working time of the first communication system (such as LTE system) to working time of the second communication system in one time cycle;
working time of the first communication system (such as LTE system) in one time cycle;
sequence number of co-existence working mode (in case that a plurality of co-existence working modes and sequence numbers thereof are preset for the base station and the user equipment by the manufacturer and the operator);
information indicating method of processing the working mode transition time data in previous working mode (for example, indicating which one of the above three methods will be used);
information indicating applicable range of transition time (after entering co-existence working mode, after terminating co-existence working mode, or both); and
length of transition time.

Now referring to FIG. 6B, when the base station determines that the user equipment is not allowed to enter a co-existence working mode (step 605), the base station generates a mode configuration rejecting message for informing the user equipment that it is not allowed to enter a co-existence working mode (step 607B) and transmits the mode configuration rejecting message to the user equipment (step 609B). When receiving the rejecting message, the user equipment determines to not enter a co-existence working mode (step 610B).

The mode configuration rejecting message may include one or more bits. For example, in case of one bit, the bit may be set to 1 or 0 to indicate that the user equipment is rejected to start a co-existence working mode. Moreover, the base station may set a waiting time after which the user equipment is allowed to request to enter a co-existence working mode next time, that is, may specify the time at least after which the user equipment is allowed to transmit a next co-existence working mode establishing request. Specifically, the base station may encapsulate information indicating a time interval after which the user equipment is allowed to transmit a next co-existence working mode establishing request into the mode configuration rejecting message. After receiving the mode configuration rejecting message, if the user equipment transmit a next mode establishing request (which request to enter a co-existence working mode next time), such time interval shall be waited.

As an example, establishing of a co-existence working mode may be conducted by utilizing the existing RRC (Radio Resource Control) singling during the initial random access process of the user equipment to the base station.

Taking LTE communication system which is the first communication system as an example, in case that the user equipment in the LTE system is in RRC_Idle condition or in transition time from the RRC_Idle condition to RRC_Connected condition, if the user equipment needs to enter a co-existence working mode (such as detects that there is an interfering system), the establishing process of the co-existence working mode may be achieved by the initial random access.

As a specific example, the mode establishing request transmitted by the user equipment to the base station may be carried based on Msg3 message (i.e., "RRCConnectionRequest" message) of LTE standards. For example, the user equipment may add information indicating to request to establish a co-existence working mode to the Msg3 message and transmit it to the base station, thereby request to enter the co-existence working mode to the base station.

The establishing response message fed back by the base station to the user equipment may be carried by utilizing "RRCConnectionSetup" message in LTE standards. Specifically, after receiving the mode establishing request, the base station may add configuration information of a co-existence working mode allowed to be utilized by the user equipment to the "RRCConnectionSetup" message and transmit the message to the user equipment.

The mode configuration completing message fed back by the user equipment after completing configuration of the co-existence working mode to the base station may be carried by "RRCConnectionSetupComplete" message in LTE standards. The user equipment may add information indicating that the configuration of the co-existence working mode has been completed to the message and transmit it to the base station.

In this way, once the user equipment enters the RRC_Connected condition, it may enter the co-existence working mode that has been configured.

In another example, in case that the user equipment has been in the RRC_Connected condition, if the user equipment needs to enter a co-existence working mode (such as detects that there is an interfering system), the establishing process of the co-existence working mode may be conducted in RRC layer.

In a specific example, after entering the RRC_Connected condition, the user equipment may establish the co-existence working mode by utilizing existing RRC connection reconfiguration and reestablishing mode. In another specific example, after entering the RRC_Connected condition, the user equipment may establish the co-existence working mode by creating a new working mode.

A specific example of establishing a co-existence working mode by utilizing existing RRC connection reconfiguration (RRC_Connection_Reconfiguration) flow is described below. LTE system is taken as the main communication system in this specific example.

The mode establishing request transmitted by the user equipment to the base station may be transmitted in a form of RRC command. For example, a new RRC command may be added based on LTE standards, which is indicated by "RRC_CoEX_Establishment_Request". The command may include, for example, one or more of the following information:

RRC_CoEX_Establishment_Request:
    InterferenceType:(TypeI TypeII TypeIII)
    InterferenceSevice1:(TypeI, TypeII, TypeIII, TypeIV)
    InterferenceSevice2:(TypeI, TypeII, TypeIII, TypeIV)
    Mode:(mode1, mode2, mode3, . . . , modeN)
    Period:(sf0, sf1, sf2, . . . , sfT)
    Delay:(sf0, sf1, sf2, . . . , sfM)
    LTETime:(sf0, sf1, sf2, . . . , sfL)
    Guard:(Yes, No)
    GuardTime:(sf10, sf15, sf20, sf25, sf30, sf35, sf40)

wherein, InterferenceType:(TypeI TypeII TypeIII) indicates type of the interfering system detected by the user equipment, in which TypeI, TypeII, TypeIII may indicate that the interfering system is a WLAN, the interfering system is a Bluetooth device, the interfering system is a GPS terminal, respectively. InterferenceType may be indicated by three Boolean values. If value of corresponding type is 0, it means that corresponding system is not in activated condition; and if value of corresponding type is 1, it means that corresponding system is in the activated condition. For example, when InterferenceType value is (101), it means that there are 2 interfering systems in activated condition, which are WLAN system and GPS system respectively. InterferenceSevice1:(TypeI, TypeII, TypeIII, TypeIV) indicates service type of WLAN system which is currently in activated condition, in which TypeI, TypeII, TypeIII, TypeIV indicate web page browse, mass downloading or mass uploading, web game and other service respectively. InterferenceSevice2:(TypeI, TypeII, TypeIII, TypeIV) indicates service type of Bluetooth device which is currently in activated condition, in which TypeI, TypeII, TypeIII, TypeIV indicate idle condition, voice service (taking by utilizing a Bluetooth earphone), mass downlink (such as listening music by utilizing a Bluetooth earphone) and other service respectively. Mode:(mode1, mode2, mode3, . . . , modeN) indicates sequence number of the co-existence working mode recommended by the user equipment, in which mode1, mode2, mode3, . . . , modeN indicate N (N≥1) co-existence working modes preset by system (preset in the user equipment or the base station by the manufacturer or the operator). Delay:(sf0, sf1, sf2, . . . , sfM) indicates length of start delay recommended by the user equipment to the base station, in which sf0, sf1, sf2, . . . , sfM indicate 0 subframe, 1 subframe, 2 subframes, . . . , M (M≥1) subframes respectively. Period:(sf0, sf1, sf2, . . . , sfT) indicate length of co-existence cycle recommended by the user equipment to the base station, in which sf0, sf1, sf2, . . . , sfT indicate 0 subframe, 1 subframe, 2 subframes, . . . , T (T≥1) subframes respectively. In case that the co-existence working mode is based on time-division and the time-division is indicated in a form of time cycle, co-existence cycle may be defined, in which each co-existence cycle has working time of the first communication system (such as LTE) and working time of the second communication system (such as ISM). LTETime: (sf0, sf1, sf2, . . . , sfL) indicates length of working time of LTE in one co-existence cycle recommended by the user equipment to the base station, in which sf0, sf1, sf2, . . . , sfL indicate 0 subframe, 1 subframe, 2 subframes, . . . , L (L≥1) subframes respectively. Guard:(Yes, No) indicates whether the user equipment recommends to use a transition time. GuardTime:(sf10, sf15, sf20, sf25, sf30, sf35, sf40) indicates length of the transition time recommended by the user equipment. For example, sf10, sf15, sf20, sf25, sf30, sf35, sf40 indicate 10 subframes, 15 subframes, 20 subframes, 30 subframes, 35 subframes, 40 subframes respectively; and GuardTime:(sf10, sf15, sf20, sf25, sf30, sf35, sf40) indicates that length of the transition time recommended by the user equipment to the base station is 10 subframes, 15 subframes, 20 subframes, 30 subframes, 35 subframes, or 40 subframes.

The establishing response message transmitted by the base station to the user equipment may be carried based on RRCConnectionReconfiguration message of LTE standards. The message (indicated by RRC_CoEX_Config) may include one or more of the following information:

RRC_CoEX_Config:
State:(accept, reject)
Mode:(mode1, mode2, mode3, . . . , modeN)
Delay:(sf0, sf1, sf2, . . . , sfM)
Period:(sf0, sf1, sf2, . . . , sfT)
LTETime:(sf0, sf1, sf2, . . . , sfL)
GuardIndicateRange:(1,2)
GuardMode:(None, typeI, typeII, typeIII, typeIV)
GuardTime:(sf10, sf15, sf20, sf25, sf30, sf35, sf40)

wherein, State:(accept, reject) indicates information of allowing or rejecting the user equipment to enter a co-existence working mode; Mode:(mode1, mode2, mode3, . . . , modeN) indicates sequence number of the co-existence working mode allowed by the base station to be used by the user equipment, and mode1, mode2, mode3, . . . , modeN indicate N (N≥1) co-existence working modes preset by system (preset in the user equipment or the base station by the manufacturer or the operator). Delay:(sf0, sf1, sf2, . . . , sfM) indicates length of start delay of the co-existence working mode selected by the base station for the user equipment, in which sf0, sf1, sf2, . . . , sfM indicate 0 subframe, 1 subframe, 2 subframes, . . . , M (M≥1) subframes respectively. Period:(sf0, sf1, sf2, . . . , sfT) indicate length of co-existence cycle selected by the base station for the user equipment, in which sf0, sf1, sf2, . . . , sfT indicate 0 subframe, 1 subframe, 2 subframes, . . . , T (T≥1) subframes respectively. LTETime:(sf0, sf1, sf2, . . . , sfL) indicates length of working time of LTE in one co-existence cycle selected by the base station for the user equipment. GuardIndicateRange:(1,2) indicate applicable range of the transition time. For example, 1 indicates that the transition time is only applicable for transition process for entering a co-existence working mode from other working mode (normal working mode or other co-existence working mode); 2 indicates the transition time is applicable not only for transition process for entering a co-existence working mode from other working mode, but also for transition process for entering other working mode from a co-existence working mode. GuardMode:(None, typeI, typeII, typeIII, typeIV) indicates method of processing the working mode transition time data selected by the base station for the user equipment. For example, None indicates that no action will be taken, that is, when entering a co-existence working mode, signaling and data in previous working mode which has been scheduled but transmission of which has not been started and/or signaling and data in previous working mode transmission of which has been started but not been completed is transmitted (according to the previous working mode) until they are transmitted correctly or HARQ maximum retransmission times is reached. typeI is type I which indicates that when entering a co-existence working mode, all the signaling and data in previous working mode transmission of which has not been completed is stopped until after entering the co-existence working mode, and then they are rescheduled and retransmitted according to timing relationship of the co-existence working mode (i.e., the first exemplary method of processing the working mode transition time data as described above). typeII is type II which indicates that when entering a co-existence working mode, subsequent transmission of all the signaling and data transmission of which has not been completed is resumed according to timing relationship of the co-existence working mode (i.e., the third exemplary method of processing the working mode transition time data as described above). typeIII is type III which indicates that during transition from pervious working mode to a co-existence working mode or from the co-existence working mode to next working mode, a transition time is set (i.e., the second exemplary method of processing the working mode transition time data as described above). GuardTime:(sf10, sf15, sf20, sf25, sf30, sf35, sf40) indicates length of the transition time selected by the base station, in which sf10, sf15, sf20, sf25, sf30, sf35, sf40 indicate 10 subframes, 15 subframes, 20 subframes, 30 subframes, 35 subframes, 40 subframes respectively; and GuardTime:(sf10, sf15, sf20, sf25, sf30, sf35, sf40) indicates that the length of the transition time is 10 subframes, 15 subframes, 20 subframes, 30 subframes, 35 subframes, or 40 subframes.

The mode configuration completing message fed back by the user equipment to the base station may be carried by utilizing RRCConnectionReconfigurationComplete message of LTE standards.

The mode configuration rejecting message transmitted by the base station to the user equipment may be carried by utilizing RRCConnectionReject message of LTE standards.

A specific example of establishing a co-existence working mode by utilizing a new RRC working flow (indicated by RRC_CoEX_Establishment) is described below. LTE system is also taken as the main communication system in this specific example.

A new RRC command may be added to carry the mode establishing request transmitted by the user equipment to the base station, which is indicated by "RRC_CoEX_Establishment_Request" and may include one or more of the following information:

RRC_CoEX_Establishment_Request:
InterferenceType:(TypeI TypeII TypeIII)
InterferenceSevice1:(TypeI, TypeII, TypeIII, TypeIV)
InterferenceSevice2:(TypeI, TypeII, TypeIII, TypeIV)
Mode:(mode1, mode2, mode3, . . . , modeN)
Period:(sf0, sf1, sf2, . . . , sfT)
Delay:(sf0, sf1, sf2, . . . , sfM)
LTETime:(sf0, sf1, sf2, . . . , sfL)
Guard:(Yes, No)
GuardTime:(sf10, sf15, sf20, sf25, sf30, sf35, sf40)
each of which is similar to that in the previous example and description thereof will not be repeated.

A new RRC command may be added to carry the mode configuration message fed back by the base station to the user equipment, which is indicated by "RRC_CoEX_Configuration" and may include one or more of the following information:

RRC_CoEX_Configuration:
State: (accept, reject)
Mode:(mode1, mode2, mode3, . . . , modeN)
Delay:(sf0, sf1, sf2, . . . , sfM)
Period:(sf0, sf1, sf2, . . . , sfT)
LTETime:(sf0, sf1, sf2, . . . , sfL)
GuardIndicateRange:(1,2)
GuardMode:(None, typeI, typeII, typeIII, typeIV)
GuardTime:(sf10, sf15, sf20, sf25, sf30, sf35, sf40)
each of which is similar to that in the previous example and description thereof will not be repeated.

A new RRC command may be added to carry the mode configuration completing message fed back by the user equipment to the base station, which is indicated by "RRC_CoEX_Establishment_complete_response" and may include one or more of the following information:

RRC_CoEX_Establishment_complete_response:
State:(success, fail)
FailReason:(reason0, reason1, . . . )
wherein, State:(success, fail) indicates whether the co-existence working mode has been configured successfully; and FailReason:(reason0, reason1, . . . ) indicates reason of configuration failure (when the co-existence working mode is not successful, the user equipment may encapsulate such information into the fed back configuration completing message).

A new RRC command may be added to carry the mode configuration rejecting message fed back by the base station to the user equipment, which is indicated by "RRC_CoEX_Reject" and may include one or more of the following information:
RRC_CoEX_Reject:
RetryDelayType:(sf10, sf15, sf20, sf25, sf30)
wherein, sf10, sf15, sf20, sf25, sf30 indicate 10 subframes, 15 subframes, 20 subframes, 30 subframes, respectively; and RetryDelayType:(sf10, sf15, sf20, sf25, sf30) indicates that minimum time interval selected by the base station for the user equipment to retransmit the co-existence working mode establishing request is 10 subframes, 15 subframes, 20 subframes, or 30 subframes. That is, if the user equipment wants to request to establish a co-existence working mode next time, the time of transmit next request shall be after the time interval.

Some examples of establishing a co-existence working mode by utilizing RRC layer signaling have been given above. It is understood that the above examples are exemplary. For example, some specific signaling contents have been shown schematically. In practical applications, it is possible to make modifications, deletions according to the contents, and the invention is not limited to these examples.

As another example, the mode establishing request transmitted by the user equipment to the base station may also be transmitted in a form of MAC (Media Access Control) command. For example, a new MAC control element (CE) may be added based on LTE standards, which is referred to "CoEX-MAC CE". A new LCID value may be defined for the CoEX-MAC CE. For example, the LCID value may be "01011".

Comparing with transmitting the mode establishing request by utilizing RRC layer, a co-existence working mode can be established by utilizing MAC layer signaling more quickly. In addition, since MAC layer signaling also has corresponding HARQ flow, reliability of establishing signaling of co-existence working mode may be guaranteed well.

Figure 7:
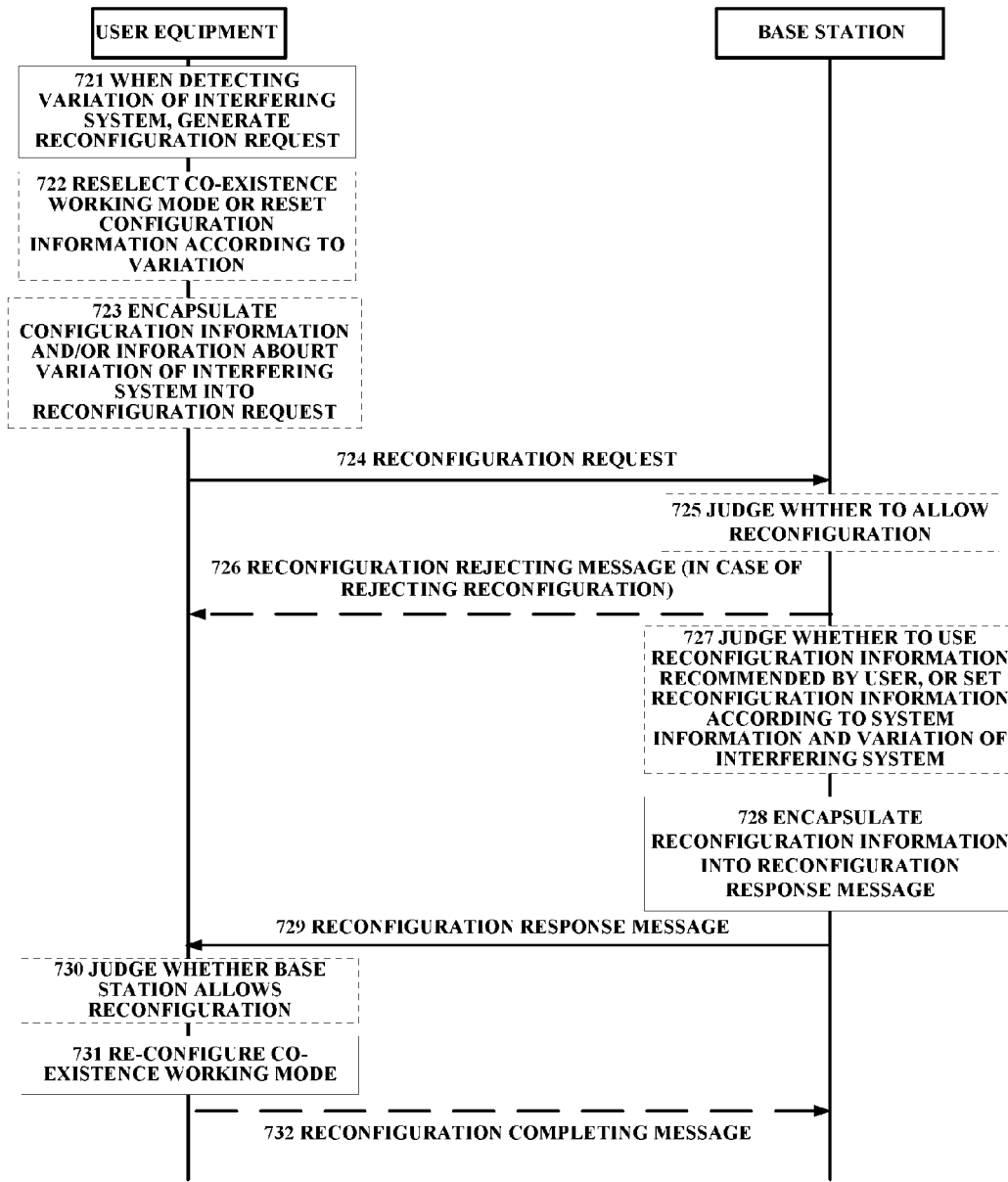
FIG. 7 is a schematic diagram illustrating a method for re-configuring the co-existence working mode according to an embodiment of the disclosure.

FIG. 7 is a schematic diagram illustrating a method for re-configuring the co-existence working mode after establishing the co-existence working mode according to an embodiment of the disclosure. In the embodiment shown in FIG. 7, reconfiguration of the co-existence working mode is triggered by the user equipment.

As shown in FIG. 7, after a co-existence working mode is established successfully, if the user equipment needs to change the co-existence working mode (such as detects that the interfering system is changed), the user equipment may generates a reconfiguration request (step 721) for request the base station to re-configure the co-existence working mode in order to be applicable for the changed interfering system.

The reconfiguration request may include one or more bits.

As an example, the reconfiguration request may include one bit, the value of which may be set to 1 or 0 to inform the base station that the user equipment needs to re-configure the co-existence working mode.

In other examples, the reconfiguration request may include a plurality of bits. Alternatively, the user equipment may encapsulate information related to variation of the interfering system into the reconfiguration request (step 723) in order to provide support for decision of the base station. Alternatively, the user equipment may also encapsulate reconfiguration information (such as configuration information of the co-existence working mode reselected by itself according to the variation of the interfering system) recommended by itself for re-configuring the co-existence working mode into the reconfiguration request for reference by the base station. As a specific example, the reconfiguration request may include one or more of the following information:

type of the current interfering system (such as information about whether the interfering system is a GPS system or an ISM system, which ISM system the interfering system is, and the like);

service of the current interfering system (as for WLAN system, web page browse, uploading and downloading service, and online game may need different time slot length and different frequency; as for Bluetooth earphone, talking, standby, and music playing may need different time slot length and different frequency);

configuration information or reconfiguration information of the co-existence working mode recommended by the user equipment; for example, the user equipment may encapsulate the recommended configuration information into the reconfiguration request; for example, if one or more co-existence working modes and configuration information for each co-existence working mode are set in the first communication system (for example, the information may be preset in the user equipment by manufacturer according to standards of the first communication system before delivery, or preset in the user equipment by network operator according to standards of the first communication system), the user equipment may encapsulate information of the selected co-existence working mode (such as sequence number) as indicated by user into the reconfiguration request.

In an example, if the new co-existence working mode recommended by the user equipment has only one or several different parameters from that of the current co-existence working mode, the user equipment may only need to encapsulate configuration information which is needed to be changed (such as some parameters which are needed to be changed) into the reconfiguration request as recommended reconfiguration information.

At step 724, the user equipment transmits the reconfiguration request to the base station. After receiving the reconfiguration request, the base station may generates a reconfiguration response message (step 728). Alternatively, before step 728, the base station may judge whether to allow the co-existence working mode reconfiguration request of the user equipment according to system operation condition and first communication service of the user equipment (step 725). If not, a reconfiguration rejecting message is transmitted to the user equipment at step 726, which informs the user equipment that reconfiguration of the co-existence working mode is not allowed; if yes, the next judgment is performed. Alternatively, if the reconfiguration request includes information indicating configuration information or reconfiguration information of the co-existence working mode recommended by the user equipment, the base station may judge whether to directly accept the configuration information or the reconfiguration information of the co-existence working mode recommended by the user equipment at step 727. If so, the base station encapsulates information indicating that the co-existence working mode recommended by the user equipment is allowed to be used into the reconfiguration response message at step 728; if not, the base station select other co-existence working mode for the user equipment according to actual condition (such as the current cell condition (such as the current resource usage condition) and/or the user equipment condition (such as the current service of the user equipment) and/or the variation of the interfering system), and encapsulate configuration information or reconfiguration information of the selected co-existence working mode into the reconfiguration response message at step 728. In an example, if the new co-existence working mode selected by the base station for the user equipment has only one or several different parameters from that of the current co-existence working mode, the base station may only need to encapsulate configuration information which is needed to be changed (such as some parameters which are needed to be changed) into the reconfiguration response message as reconfiguration information.

At step 729, the base station transmits the reconfiguration response message to the user equipment.

After receiving the reconfiguration response message or the reconfiguration rejecting message, the user equipment judges whether the base station allows to re-configure (step 730). If not, the process ends; and if yes, the co-existence working mode is re-configured according to the configuration information or the reconfiguration information in the reconfiguration response message (step 731).

After the reconfiguration is completed, the user equipment may transmit a reconfiguration completing message to the base station (step 732), which includes information indicating whether reconfiguration of the co-existence working mode has been completed.

Figure 8:
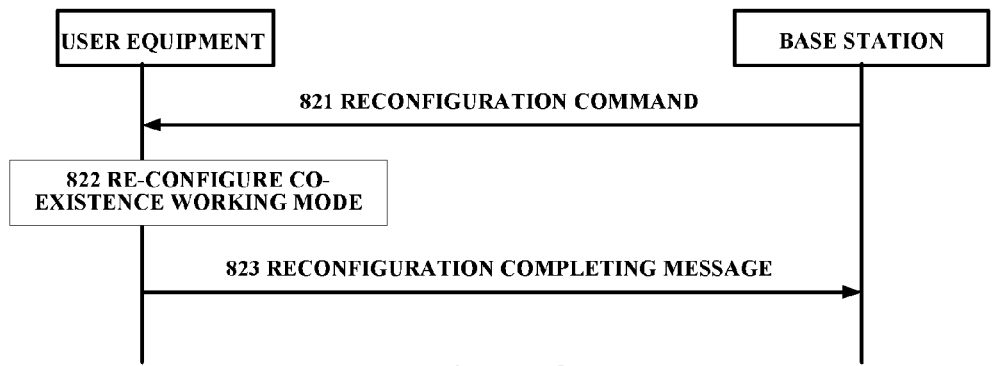
FIG. 8 is a schematic diagram illustrating a method for re-configuring the co-existence working mode according to another embodiment of the disclosure.

FIG. 8 is a schematic diagram illustrating a method for re-configuring the co-existence working mode after establishing the co-existence working mode according to another embodiment of the disclosure. In the embodiment shown in FIG. 8, reconfiguration of the co-existence working mode is triggered by the base station.

As shown in FIG. 8, after a co-existence working mode is established successfully, if the base station needs to change the co-existence working mode (such as the base station detects that system operation condition is changed), the base station may transmit a reconfiguration command to the user equipment (step 821) for requesting the base station to re-configure the co-existence working mode in order to be applicable for the variation of system operation. The reconfiguration command includes reconfiguration information for re-configuring the co-existence working mode such as configuration information of the co-existence working mode reselected by base station for the user equipment. In an example, if the new co-existence working mode selected by the base station for the user equipment has only one or several different parameters from that of the current co-existence working mode, the base station may only need to encapsulate configuration information which is needed to be changed (such as some parameters which are needed to be changed) into the reconfiguration request as recommended reconfiguration information and transmit it to the user equipment.

After receiving the reconfiguration command, the user equipment re-configures the co-existence working mode according to the reconfiguration information in the command (step 822). After the reconfiguration is completed, the user equipment feeds back reconfiguration completing message to the base station (step 823), which includes information indicating whether reconfiguration of the co-existence working mode has been completed.

As a specific example, the reconfiguration response message or the reconfiguration command transmitted by the base station may include validation delay or validation time of reconfiguration. The user equipment may determine the time of validating the reconfiguration according to the validation delay or the validation time and the time of transmitting the reconfiguration completing message. After receiving the reconfiguration completing message, the base station may determine the time of validating the reconfiguration according to the time of receiving the reconfiguration completing message and the validation delay or the validation time. In another example, the reconfiguration response message or the reconfiguration command transmitted by the base station may not includes validation delay or validation time of reconfiguration. After the base station receives the reconfiguration completing message, the reconfiguration of the co-existence working mode is validated immediately.

As another specific example, the reconfiguration response message or the reconfiguration command transmitted by the base station may also include information indicating transition time. The base station may encapsulate information indicating whether to need a transition time and length of the transition time into the reconfiguration response message or the reconfiguration command. After receiving the reconfiguration response message or the reconfiguration command, the user equipment may judge whether there is a transition time. If so, the user equipment continues to transmit data by using previous working mode or configuration information during the transition time after the reconfiguration is validated.

In a specific example, the reconfiguration response message or the reconfiguration command transmitted by the base station to the user equipment may include one or more of the following information:

validation delay of reconfiguration;
   time cycle of the re-configured co-existence working mode (including working time of the first communication and working time of the second communication);
   ratio of working time of the first communication system (such as LTE system) to working time of the second communication system in one time cycle;
   working time of the first communication system (such as LTE system) in one time cycle;
   sequence number of the re-configured co-existence working mode (in case that a plurality of co-existence working modes and sequence numbers thereof are preset for the base station and the user equipment by the manufacturer and the operator);
   information indicating method of processing the working mode transition time data in previous working mode (for example, indicating which one of the above three methods will be used);
   information indicating applicable range of transition time (after the re-configured entering co-existence working mode, after terminating the re-configured co-existence working mode, or both); and
   length of transition time.

In a specific example, the reconfiguration rejecting message transmitted by the base station to the user equipment may include one or more bits. For example, the reconfiguration rejecting message may include only one bit, value of which may be set to 1 or 0 to indicate that the request of the user equipment to re-configure the co-existence working mode is rejected. In other examples, the reconfiguration rejecting message may include more than one bit. Alternatively, the base station may encapsulate a waiting time after which the user equipment is allowed to request to enter a co-existence working mode next time into the reconfiguration rejecting message, that is, may specify the time at least after which the user equipment is allowed to transmit a next reconfiguration request. After receiving the reconfiguration rejecting message, if the user equipment transmits a next reconfiguration request (which request to re-configure the co-existence working mode next time), such time interval shall be waited.

Reconfiguration process of the co-existence working mode as described above may be conducted in RRC layer. In other words, each of the reconfiguration request, the reconfiguration rejecting message, the reconfiguration response message, the reconfiguration completing message, and the reconfiguration command involved in reconfiguration may be a RRC command.

In a specific example, the co-existence working mode may be re-configured by utilizing existing RRC connection reconfiguration and reestablishing mode. In another specific example, the co-existence working mode may be re-configured by creating a new working mode.

A specific example of re-configuring the co-existence working mode by utilizing existing RRC connection reconfiguration (RRC_Connection_Reconfiguration) flow is described below. LTE system is taken as the main communication system in this specific example.

A new RRC command may be added to carry the reconfiguration request, which is indicated by "RRC_CoEX_reconfiguration_request" and may include one or more of the following information:
  RRC_CoEX_reconfiguration_request:
  InterferenceType:(TypeI TypeII TypeIII)
  InterferenceSevice1:(TypeI, TypeII, TypeIII, TypeIV)
  InterferenceSevice2:(TypeI, TypeII, TypeIII, TypeIV)
  Mode:(mode1, mode2, mode3, . . . , modeN)
  Period:(sf0, sf1, sf2, . . . , sfT)
  Delay:(sf0, sf1, sf2, . . . , sfM)
  LTETime:(sf0, sf1, sf2, . . . , sfL)
  Guard:(Yes, No)
  GuardTime:(sf10, sf15, sf20, sf25, sf30, sf35, sf40)

wherein, InterferenceType:(TypeI TypeII TypeIII) indicates type of the interfering system detected by the user equipment, in which TypeI, TypeII, TypeIII may indicate that the interfering system is a WLAN, the interfering system is a Bluetooth device, the interfering system is a GPS terminal, respectively. InterferenceType may be indicated by three Boolean values. If value of corresponding type is 0, it means that corresponding system is not in activated condition; and if value of corresponding type is 1, it means that corresponding system is in the activated condition. For example, when InterferenceType value is (101), it means that there are 2 interfering systems in activated condition, which are WLAN system and GPS system respectively. InterferenceSevice1:(TypeI, TypeII, TypeIII, TypeIV) indicates service type of WLAN system which is currently in activated condition, in which TypeI, TypeII, TypeIII, TypeIV indicate web page browse, mass downloading or mass uploading, web game and other service respectively. InterferenceSevice2:(TypeI, TypeII, TypeIII, TypeIV) indicates service type of Bluetooth device which is currently in activated condition, in which TypeI, TypeII, TypeIII, TypeIV indicate idle condition, voice service (taking by utilizing a Bluetooth earphone), mass downlink (such as listening music by utilizing a Bluetooth earphone) and other service respectively. Mode:(mode1, mode2, mode3, . . . , modeN) indicates sequence number of the re-configured co-existence working mode recommended by the user equipment, in which mode1, mode2, mode3, . . . , modeN indicate N (N≥1) co-existence working modes preset by system (preset in the user equipment or the base station by the manufacturer or the operator). Delay:(sf0, sf1, sf2, . . . , sfM) indicates length of start delay of the re-configured co-existence working mode recommended by the user equipment to the base station, in which sf0, sf1, sf2, . . . , sfM indicate 0 subframe, 1 subframe, 2 subframes, . . . , M (M≥1) subframes respectively. Period:(sf0, sf1, sf2, . . . , sfT) indicate length of co-existence cycle of the re-configured co-existence working mode recommended by the user equipment to the base station, in which sf0, sf1, sf2, . . . , sfT indicate 0 subframe, 1 subframe, 2 subframes, . . . , T (T≥1) subframes respectively. LTETime:(sf0, sf1, sf2, . . . , sfL) indicates length of working time of LTE in one co-existence cycle recommended by the user equipment to the base station, in which sf0, sf1, sf2, . . . , sfL indicate 0 subframe, 1 subframe, 2 subframes, . . . , L (L≥1) subframes respectively. Guard:(Yes, No) indicates whether the user equipment recommends to use a transition time. GuardTime:(sf10, sf15, sf20, sf25, sf30, sf35, sf40) indicates length of the transition time recommended by the user equipment. For example, sf10, sf15, sf20, sf25, sf30, sf35, sf40 indicate 10 subframes, 15 subframes, 20 subframes, 30 subframes, 35 subframes, 40 subframes respectively; and GuardTime:(sf10, sf15, sf20, sf25, sf30, sf35, sf40) indicates that the length of the transition time recommended by the user equipment to the base station is 10 subframes, 15 subframes, 20 subframes, 30 subframes, 35 subframes, or 40 subframes.

The reconfiguration response message transmitted by the base station to the user equipment may be carried based on RRCConnectionReconfiguration message of LTE standards. The message (indicated by RRC_CoEX_reconfiguration) may include one or more of the following information:
  RRC_CoEX_reconfiguration:
  State:(accept, reject)
  Mode:(mode1, mode2, mode3, . . . , modeN)
  Delay:(sf0, sf1, sf2, . . . , sfM)
  Period:(sf0, sf1, sf2, . . . , sfT)
  LTETime:(sf0, sf1, sf2, . . . , sfL)
  GuardIndicateRange:(1,2)
  GuardMode:(None, typeI, typeII, typeIII, typeIV)
  GuardTime:(sf10, sf15, sf20, sf25, sf30, sf35, sf40)

wherein, State:(accept, reject) indicates information of allowing or rejecting the user equipment to re-configure the co-existence working mode; Mode:(mode1, mode2, mode3, . . . , modeN) indicates sequence number of the re-configured co-existence working mode allowed by the base station to be used by the user equipment, and mode1, mode2, mode3, . . . , modeN indicate N (N≥1) co-existence working modes preset by system (preset in the user equipment or the base station by the manufacturer or the operator). Delay:(sf0, sf1, sf2, . . . , sfM) indicates length of start delay of the re-configured co-existence working mode selected by the base station for the user equipment, in which sf0, sf1, sf2, . . . , sfM indicate 0 subframe, 1 subframe, 2 subframes, . . . , M (M≥1) subframes respectively. Period:(sf0, sf1, sf2, . . . , sfT) indicate length of co-existence cycle selected by the base station for the user equipment, in which sf0, sf1, sf2, . . . , sfT indicate 0 subframe, 1 subframe, 2 subframes, . . . , T (T≥1) subframes respectively. LTETime:(sf0, sf1, sf2, . . . , sfL) indicates length of working time of LTE in one co-existence cycle selected by the base station for the user equipment. GuardIndicateRange:(1,2) indicate applicable range of the transition time. For example, 1 indicates that the transition time is only applicable for transition process from the current co-existence working mode to the new co-existence working mode (the re-configured co-existence working mode); 2 indicates the transition time is applicable not only for transition process from the current co-existence working mode to the new co-existence working mode, but also for transition process for terminating the new co-existence working mode. GuardMode:(None, typeI, typeII, typeIII, typeIV) indicates method of processing the working mode transition time data selected by the base station for the user equipment. For example, None indicates that no action will be taken, that is, when entering the new co-existence working mode (the re-configured co-existence working mode), signaling and data in original co-existence working mode which has been scheduled but transmission of which has not been started and/or signaling and data in original co-existence working mode transmission of which has been started but not been completed is transmitted (according to the original co-existence working mode) until they are transmitted correctly or HARQ maximum retransmission times is reached. typeI is type I which indicates that when entering the new co-existence working mode, all the signaling and data in previous working mode transmission of which has not been completed is stopped until after entering the new co-existence working mode, and then they are rescheduled and retransmitted according to timing relationship of the new co-existence working mode (i.e., the first exemplary method of processing the working mode transition time data as described above). typeII is type II which indicates that when entering the new co-existence working mode, subsequent transmission of all the signaling and data transmission of which has not been completed is resumed according to timing relationship of the new co-existence working mode (i.e., the third exemplary method of processing the working mode transition time data as described above). typeIII is type III which indicates that during transition from the current working mode to the new co-existence working mode or transition of terminating the new co-existence working mode, a transition time is set (i.e., the second exemplary method of processing the working mode transition time data as described above). GuardTime:(sf10, sf15, sf20, sf25, sf30, sf35, sf40) indicates length of the transition time selected by the base station, in which sf10, sf15, sf20, sf25, sf30, sf35, sf40 indicate 10 subframes, 15 subframes, 20 subframes, 30 subframes, 35 subframes, 40 subframes respectively; and GuardTime:(sf10, sf15, sf20, sf25, sf30, sf35, sf40) indicates that the length of the transition time is 10 subframes, 15 subframes, 20 subframes, 30 subframes, 35 subframes, or 40 subframes.

The reconfiguration completing message fed back by the user equipment to the base station may be carried by utilizing RRCConnectionReconfigurationComplete message of LTE standards.

The reconfiguration rejecting message transmitted by the base station to the user equipment may be carried by utilizing RRCConnectionReject message of LTE standards.

A specific example of re-configuring the co-existence working mode by utilizing a new RRC working flow (indicated by RRC_CoEX_Reconfiguration) is described below. LTE system is also taken as the main communication system in this specific example.

A new RRC command may be added to carry the reconfiguration request transmitted by the user equipment to the base station, which is indicated by "RRC_CoEX_reconfiguration_request" and may include one or more of the following information:

RRC_CoEX_reconfiguration_request:
InterferenceType:(TypeI TypeII TypeIII)
InterferenceSevice1:(TypeI, TypeII, TypeIII, TypeIV)
InterferenceSevice2:(TypeI, TypeII, TypeIII, TypeIV)
Mode:(mode1, mode2, mode3, . . . , modeN)
Period:(sf0, sf1, sf2, . . . , sfT)
Delay:(sf0, sf1, sf2, . . . , sfM)
LTETime:(sf0, sf1, sf2, . . . , sfL)
Guard:(Yes, No)
GuardTime:(sf10, sf15, sf20, sf25, sf30, sf35, sf40)
each of which is similar to that in the previous example and description thereof will not be repeated.

A new RRC command may be added to carry the reconfiguration response message fed back by the base station to the user equipment, which is indicated by "RRC_CoEX_reconfiguration" and may include one or more of the following information:

RRC_CoEX_reconfiguration:
State: (accept, reject)
Mode:(mode1, mode2, mode3, . . . , modeN)
Delay:(sf0, sf1, sf2, . . . , sfM)
Period:(sf0, sf1, sf2, . . . , sfT)
LTETime:(sf0, sf1, sf2, . . . , sfL)
GuardIndicateRange:(1,2)
GuardMode:(None, typeI, typeII, typeIII, typeIV)
GuardTime:(sf10, sf15, sf20, sf25, sf30, sf35, sf40)
each of which is similar to that in the previous example and description thereof will not be repeated.

A new RRC command may be added to carry the reconfiguration completing message fed back by the user equipment to the base station, which is indicated by "RRC_CoEX_reconfiguration_complete_response" and may include one or more of the following information:

RRC_CoEX_reconfiguration_complete_response:
State:(success, fail)
FailReason:(reason0, reason1, . . . )
wherein, State:(success, fail) indicates whether the co-existence working mode has been reconfigured successfully; and FailReason:(reason0, reason1, . . . ) indicates reason of reconfiguration failure (when the co-existence working mode is not re-configured successfully, the user equipment may encapsulate such information into the fed back reconfiguration completing message).

A new RRC command may be added to carry the reconfiguration rejecting message fed back by the base station to the user equipment, which is indicated by "RRC_CoEX_reconfiguration_reject" and may include one or more of the following information:

RRC_CoEX_reconfiguration_reject:
RetryDelayType:(sf10, sf15, sf20, sf25, sf30)
wherein, sf10, sf15, sf20, sf25, sf30 indicate 10 subframes, 15 subframes, 20 subframes, 30 subframes, respectively; and RetryDelayType:(sf10, sf15, sf20, sf25, sf30) indicates that minimum time interval selected by the base station for the user equipment to retransmit the reconfiguration_request is 10 subframes, 15 subframes, 20 subframes, or 30 subframes. That is, if the user equipment wants to request to re-configure the co-existence working mode next time, the time of transmit next request shall be after the time interval.

Some examples of re-configuring the co-existence working mode by utilizing RRC layer signaling have been given above. It is understood that the above examples are exemplary. For example, some specific signaling contents have been shown schematically. In practical applications, it is possible to make modifications, deletions according to the contents, and the invention is not limited to these examples.

Figure 9:
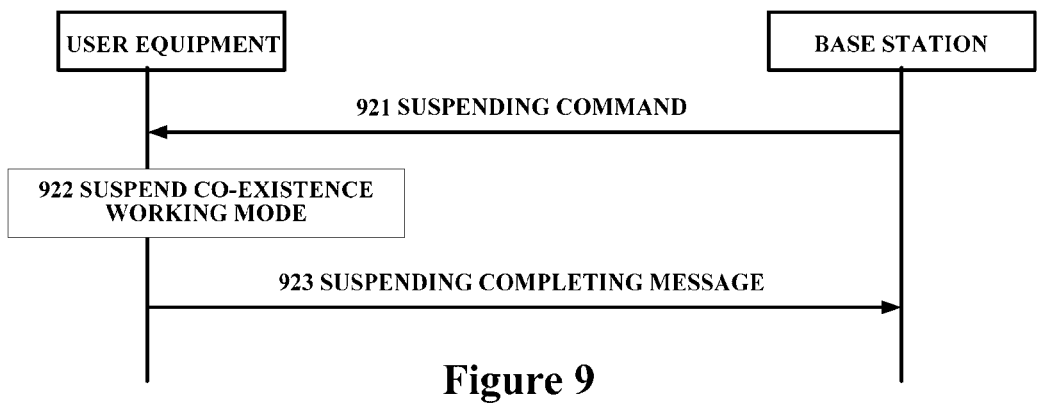
FIG. 9 is a schematic diagram illustrating a method for suspending the co-existence working mode according to an embodiment of the disclosure.

FIG. 9 illustrates a method for suspending the co-existence working mode after establishing the co-existence working mode according to an embodiment of the disclosure.

As shown in FIG. 9, suspending of the co-existence working mode is triggered by the base station. After establish the co-existence working mode successfully, the base station may judge to suspend the co-existence working mode according to the variation of system operation. For example, when the user equipment needs to perform an important operation in one or more periods (such as the base station triggers the user equipment to make measurements, or the user equipment needs to switch the cell), in order to prevent the interfering system from influencing the measurements, there is a need to suspend the second communication with the interfering system. The suspending may be performed one time or periodically. In this case, the base station may transmit a suspending command to the user equipment (step 921) to instruct the user equipment to suspend the co-existence working mode (that is, request the user equipment to suspend the second communication with device of the interfering system). The base station may instruct the user equipment to suspend the co-existence working mode one time, and also may instruct the user equipment to suspend the co-existence working mode periodically multiple times in a certain period.

After receiving the suspending command from the base station, the user equipment may suspend the co-existence working mode at a specified time according to instruction of the base station, i.e., suspend the second communication with device of the interfering system (step 922), and transmit a suspending completing message to the base station (step 923) to inform the base station whether the co-existence working mode has been suspended successfully.

The suspending command may include one or more of the following information:
  start delay of suspending or start time of suspending;
  suspending cycle;
  suspending time (i.e., time length of suspending the co-existence working mode in a suspending cycle);
  start delay of restarting or start time of restarting.

In an example, the base station may encapsulate information indicating the user equipment to suspend the co-existence working mode periodically into the suspending command and transmit the information to the user equipment. For example, the information may be a suspended cycle. The user equipment may suspend the second communication periodically according to instruction of the base station, i.e., suspend the co-existence working mode periodically.

In another example, the suspending command may contain start time or start delay of suspending the co-existence working mode. The user equipment may determine validation time of suspending according to the start delay in the suspending command and the time of receiving a confirmation signal (such as ACK signal) indicating that the base station has received the suspending completing message transmitted by the user equipment successfully, and the base station may determine the validation time of suspending according to the start delay in the suspending command and the time of transmitting the confirmation signal (such as ACK signal) indicating that the base station has received the suspending completing message successfully.

In another example, in addition to the start time of suspending the co-existence working mode, the suspending command may also contain restart time or restart delay of restarting the co-existence working mode. The user equipment may restart the co-existence working mode at the restart time specified in the suspending command (not shown). The user equipment may determine the validation time of restart according to the restart delay in the suspending command and the time of receiving the confirmation signal (such as ACK signal) indicating that the base station has received the suspending completing message transmitted by the user equipment successfully, and the base station may determine the validation time of restart according to the restart delay in the suspending command and the time of transmitting the confirmation signal (such as ACK signal) indicating that the base station has received the suspending completing message successfully.

The suspending completing message may include one or more of the following information:
  information indicating whether the user equipment suspends the co-existence working mode successfully;
  failure reason of suspending failure.

In case of suspending failure, the base station may re-trigger the user equipment to suspend the co-existence working mode at an appropriate time according to failure reason reported by the user equipment.

Figure 10:
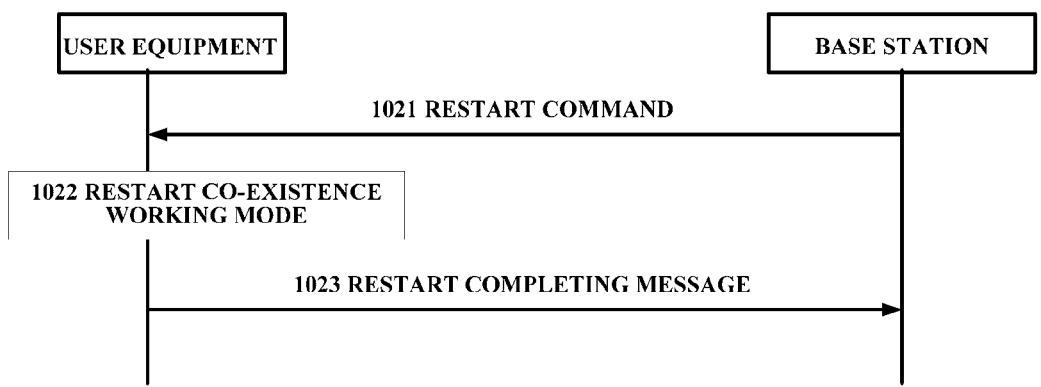
FIG. 10 is a schematic diagram illustrating a method for restarting the co-existence working mode according to an embodiment of the disclosure.

FIG. 10 illustrates another example of a method for restarting the co-existence working mode after suspending the co-existence working mode. As shown in FIG. 10, after transmitting the suspending command, the base station may trigger restart of the co-existence working mode by transmitting a restart command. After the co-existence working mode is suspended, when conditions permitting (such as the event which causes the user equipment to suspend the co-existence working mode has been terminated, for example, when the time of the user equipment completing cell measurements is earlier than expected and the measurements show that there is no need to switch cell), the base station can transmit a restart command to the user equipment to instruct the user equipment to restart the co-existence working mode (step 1201). The restart command includes restart time or restart delay of restarting the co-existence working mode. After receiving the restart command, the user equipment may restart the co-existence working mode at a specified time according to the restart command (step 1022) and transmit a restart completing message to the base station (step 1023) which includes information indicating whether the co-existence working mode has been restarted successfully. The user equipment may determine validation time of restart according to the restart delay in the restart command and the time of receiving a confirmation signal (such as ACK signal) indicating that the base station has received the restart completing message transmitted by the user equipment successfully, and the base station may determine the validation time of restart according to the restart delay in the restart command and the time of transmitting the confirmation signal (such as ACK signal) indicating that the base station has received the restart completing message successfully.

The restart completing message may include one or more of the following information:
  information indicating whether the co-existence working mode has been restarted successfully;
  failure reason of restart failure.

In case of restart failure, the base station may re-trigger the user equipment to restart the co-existence working mode at an appropriate time according to failure reason reported by the user equipment.

Suspending process and restart process of the co-existence working mode may be conducted in RRC layer. In other words, each of the suspending command, the restart command, the suspending completing command, and the restart completing message involved in the suspending process and the restart process may be a RRC command.

By taking LTE system which is the main communication system as an example, a specific example of suspending and restarting the co-existence working mode by utilizing RRC reconfiguration flow RRC_Connection_Reconfiguration is described below.

For example, the suspending command may be carried by utilizing RRCConnectionReconfiguration message. For example, the suspending command (indicated by RRC_CoEX_pending) may include one or more of the following information:

RRC_CoEX_pending:
PendingMode:(One, Periodic)
PendingStartMode:(NextFrame,Delay)
PendingDelay:(sf0, sf2, sf4, sf5, sf10, . . . , sfP)
PendingPeriod:(sf2, sf4, sf5, sf 10, . . . , sf R)
PendingTime:(sf1, sf2, sf4, sf5, sf 10, . . . , sf S)
RestartDelay:(sf0, sf2, sf4, sf5, sf 10, . . . , sf U)

wherein, PendingMode:(One, Periodic) indicates the suspending mode selected by the base station for the user equipment, in which One indicates that the suspending is performed one time according to the suspending command, Periodic indicates that the suspending is performed periodically according to the suspending command. PendingStartMode:(NextFrame,Delay) indicates the method of determining the start time of suspending the co-existence working mode. If NextFrame is activated (for example, 1 or True), the co-existence working mode is suspended from the start position of next subframe after the time of receiving the confirmation signal (such as ACK signal) indicating that the base station has received the suspending completing message transmitted by the user equipment successfully. If Delay is activated (for example, 1 or True), the validation time of suspending is calculated according to the time of receiving the confirmation signal (such as ACK signal) indicating that the base station has received the suspending completing message transmitted by the user equipment successfully and the suspending delay indicated by Pending Delay. PendingDelay:(sf0, sf2, sf4, sf5, sf10, . . . , sfP) indicates the start delay of suspending the co-existence working mode selected by the base station for the user equipment, in which sf0, sf2, sf4, sf5, sf10, . . . , sfP (P≥1) indicate 0 subframe, 2 subframes, 4 subframes, 5 subframes, 10 subframes, to P subframes, and the delay may be 0 subframe, 2 subframes, 4 subframes, 5 subframes, 10 subframes, or P subframes. PendingPeriod:(sf2, sf4, sf5, sf 10, . . . , sf R) (R≥1) indicate that the suspending cycle selected by the base station for the user equipment is 2 subframes, 4 subframes, 5 subframes, 10 subframes, or P subframes when the suspending is performed periodically. PendingTime:(sf1, sf2, sf4, sf5, sf 10, . . . , sf S) (S≥1) indicate that the suspending time in each suspending cycle selected by the base station for the user equipment is 1 subframes, 2 subframes, 4 subframes, 5 subframes, 10 subframes, or S subframes when the suspending is performed periodically. It is noted that the suspending time starts from the beginning of suspending cycle. RestartDelay:(sf0, sf2, sf4, sf5, sf 10, . . . , sf U) (U≥1) indicates that the restart delay of the suspending mode selected by the base station for the user equipment is 4 subframes, 5 subframes, 10 subframes, or S subframes.

The suspending completing message fed back by the user equipment to the base station may be carried by utilizing RRCConnectionReconfigurationComplete message.

The restart command may also be carried by utilizing RRCConnectionReconfigurationComplete message. For example, the restart command (indicated by RRC_CoEX_restart) may include one or more of the following information:

RRC_CoEX_restart:
RestartStartMode: (NextFrame,Delay)
RestartDelay:(sf0, sf2, sf4, sf5, sf10, . . . , sfP)

wherein, RestartStartMode:(NextFrame,Delay) indicates the method of determining the start time of restarting the co-existence working mode. If NextFrame is activated (for example 1 or True), the co-existence working mode is restarted from the start position of next subframe after the time of receiving the confirmation signal (such as ACK signal) indicating that the base station has received the restart completing message transmitted by the user equipment successfully. If Delay is activated (for example, 1 or True), the start time of suspending is calculated according to the time of receiving the confirmation signal (such as ACK signal) indicating that the base station has received the restart completing message transmitted by the user equipment successfully and the restart delay indicated by RestartDelay. RestartDelay:(sf0, sf2, sf4, sf5, sf10, . . . , sfP) indicates the start delay of restarting the co-existence working mode selected by the base station for the user equipment, in which sf0, sf2, sf4, sf5, sf10, . . . , sfP (P≥1) indicate 0 subframe, 2 subframes, 4 subframes, 5 subframes, 10 subframes, to P subframes respectively, and the delay may be 0 subframe, 2 subframes, 4 subframes, 5 subframes, 10 subframes, or P subframes.

The restart completing message fed back by the user equipment to the base station may also be carried by utilizing RRCConnectionReconfigurationComplete message.

A specific example of suspending and restarting the co-existence working mode with the added new RRC flows will be given below.

For example, the suspending command may be carried by utilizing the added new RRC message. For example, the suspending command (indicated by RRC_CoEX_pending) may include one or more of the following information:

RRC_CoEX_pending:
PendingMode:(One, Periodic)
PendingStartMode:(NextFrame,Delay)
PendingDelay:(sf0, sf2, sf4, sf5, sf10, . . . , sfP)
PendingPeriod:(sf2, sf4, sf5, sf 10, . . . , sf R)
PendingTime:(sf1, sf2, sf4, sf5, sf 10, . . . , sf S)
RestartDelay:(sf0, sf2, sf4, sf5, sf 10, . . . , sf U)

each of which is similar to that in the previous example and description thereof will not be repeated.

The suspending completing message may also be carried by the added new RRC signaling. For example, the message (indicated by RRC_CoEX_pending_complete_response) may include one or more of the following information:

RRC_CoEX_pending_complete_response:
State:(success, fail)
FailReason:(reason0, reason1, . . . )

wherein, State:(success, fail) indicates whether the co-existence working mode has been suspended successfully; and FailReason:(reason0, reason1, . . . ) indicates reason of suspending failure.

The restart command may also be carried by the added new RRC signaling. For example, the restart command (indicated by RRC_CoEX_restart) may include one or more of the following information:

RRC_CoEX_restart:
RestartStartMode: (NextFrame,Delay)
RestartDelay:(sf0, sf2, sf4, sf5, sf10, . . . , sfP)
each of which is similar to that in the previous example and description thereof will not be repeated.

The restart completing message may also be carried by the added new RRC signaling. For example, the message (indicated by RRC_CoEX_restart_complete_response) may include one or more of the following information:
RRC_CoEX_restart_complete_response:
State:(success, fail)
FailReason:(reason0, reason1, . . . )
wherein, State:(success, fail) indicates whether the co-existence working mode has been restarted successfully; and FailReason:(reason0, reason1, . . . ) indicates reason of restart failure.

Figure 11:
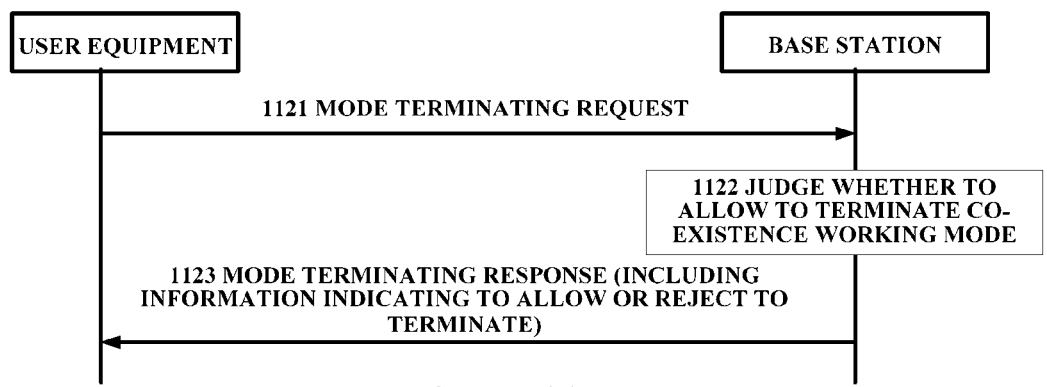
FIG. 11 is a schematic diagram illustrating a method for terminating the co-existence working mode according to an embodiment of the disclosure.

FIG. 11 illustrates a method for terminating the co-existence working mode after establishing the co-existence working mode according to an embodiment of the disclosure.

As shown in FIG. 11, terminating of the co-existence working mode may be triggered by the user equipment. After the co-existence working mode is established successfully, if the user equipment no longer needs to work in the co-existence working mode (such as when the user equipment detects that the interfering system disappears), the user equipment may transmit a mode terminating request to the base station to request to terminate the co-existence working mode (step 1121), thereby stop the second communication with the interfering system, and switch to a normal working mode (i.e., non co-existence working mode). After receiving the mode terminating request, the base station judges whether to allow the user equipment to terminate the co-existence working mode according to operation condition of the system (step 1122). If so, the base station encapsulates information indicating to allow to terminate the co-existence working mode into a mode terminating response; and if not, encapsulates information indicating to reject to terminate the co-existence working mode into the mode terminating response, and transmits the mode terminating response to the user equipment (step 1123). The user equipment judges whether to terminate the co-existence working mode according to the mode terminating response. If the judgment shows that the base station allows to terminate the co-existence working mode, the co-existence working mode is terminated, i.e., switched to a normal working mode (time resource for the second communication is released). When terminating the co-existence working mode successfully, the user equipment may transmit a mode terminating completing message to the base station, which includes information indicating that the user equipment has terminated the co-existence working mode successfully. When the user equipment does not terminate the co-existence working mode successfully, the mode terminating completing message transmitted to the base station includes information indicating the user equipment does not terminated the co-existence working mode successfully. Alternatively, it may also include information indicating reason of failure.

In an example, the mode terminating response may include information indicating terminating time or delay. The user equipment and the base station may calculates the time of terminating the co-existence working mode according to the time or delay and the time when the user equipment transmits a confirmation signal indicating that the user equipment has received the mode terminating response successfully.

Figure 12:
FIG. 12 is a schematic diagram illustrating a method for terminating the co-existence working mode according to another embodiment of the disclosure.

FIG. 12 illustrates a method for terminating the co-existence working mode after establishing the co-existence working mode according to another embodiment of the disclosure.

In the method shown in FIG. 12, terminating of the co-existence working mode is triggered by the base station. In some cases (for example, when the user equipment switches to target cell and the target cell finds out that working frequencies of original interfering system and the target cell can not interfere each other), the base station may transmit a mode terminating command to instruct the user equipment to terminate the co-existence working mode and enter a normal working mode (i.e., non co-existence working mode). After receiving the mode terminating command, the base station terminates the co-existence working mode according to the command, i.e., switched to a normal working mode (time resource for the second communication is released). When terminating the co-existence working mode successfully, the user equipment may transmit a mode terminating completing message to the base station, which includes information indicating that the user equipment has terminated the co-existence working mode successfully. When the user equipment does not terminate the co-existence working mode successfully, the mode terminating completing message transmitted to the base station includes information indicating the user equipment does not terminated the co-existence working mode successfully. Alternatively, it may also include information indicating reason of failure.

In an example, the base station may transmit the mode terminating command to the user equipment during initial access. In an example, the mode terminating command may include information indicating terminating time or delay, and the user equipment and the base station may calculate the time of terminating the co-existence working mode according to the time or delay and the time when the user equipment transmits a confirmation signal indicating that the user equipment has received the mode terminating command successfully.

The mode terminating command or the mode terminating response transmitted by the base station may include one or more bits. In an example, the mode terminating command or the mode terminating response may include only one bit, the bit may be set to 1 or 0 to inform the user equipment to terminate the co-existence working mode. If the mode terminating response is the information indicating to reject the user equipment to terminate the co-existence working mode, the bit may be set to 1 or 0 to indicate to reject request of the user equipment for terminating the co-existence working mode.

In another example, the mode terminating command or the mode terminating response may include multiple bits. For example, they may contain one or more of the following information:
information indicating the method of processing variation of control mapping relation after terminating the co-existence working mode;
information indicating how to process data in the co-existence working mode which has been scheduled or transmission of which has been started but has not been completed after terminating the co-existence working mode (for example, which one of the three methods for processing the remaining working mode transition time data in previous working mode will be used);
length of the transition time.
If the mode terminating response is the information indicating to reject request of the user equipment for terminating the co-existence working mode, it may include information indicating the time after which the user equipment can request to terminating the co-existence working mode next time. That is, the base station may encapsulate a waiting time interval after which the user equipment is allowed to request to terminating the co-existence working mode next time into the mode terminating response. After receiving the response, if the user equipment needs to transmit next request for terminating the co-existence working mode, the time interval shall be waited.

The terminating process of the co-existence working mode may be conducted in RRC layer. In other words, each of the mode terminating request, mode terminating response, mode terminating command and the like involved in the terminating process may be a RRC command.

By taking LTE system which is the main communication system as an example, in a specific example, terminating of the co-existence working mode may be achieved by utilizing existing RRC connection reconfiguration (RRCConnectionReconfiguration) flow. In this example, the mode terminating request (indicated by RRC_CoEX_Termination_Request) may include the following information:

RRC_CoEX_Termination_Request:
COEXTerm_request:(1)

Wherein, COEXTerm_request indicates that the user equipment request to terminate the co-existence working mode.

If the base station allow the user equipment to terminate the co-existence working mode, the mode terminating response (indicated by RRC_CoEX_Termination) fed back to the user equipment may include one or more of the following information (when the base station needs to terminate the co-existence working mode, the mode terminating command may also employ the following format):

RRC_CoEX_Termination:
GuardMode:(None, typeI, typeII, typeIII, typeIV)
GuardTime:(sf10, sf15, sf20, sf25, sf30, sf35, sf40)

wherein, Guard:(None, typeI, typeII, typeIII, typeIV) indicates method of processing the transition time data from the co-existence working mode to the normal working mode selected by the base station for the user equipment, in which, None indicates that no action will be taken, even though after entering the normal working mode, signaling transmission and data transmission which has not been completed in the co-existence working mode is still performed (according to the co-existence working mode) until they are transmitted correctly or HARQ maximum retransmission times is reached; typeI is type I which indicates that once entering the normal working mode, signaling and data in the co-existence working mode which has been scheduled but not been transmitted or transmission of which has been started but not been completed is stopped until after entering the normal working mode, and then they are rescheduled and retransmitted according to the normal working mode; typeII is type II which indicates that once entering a normal working mode, transmission of signaling and data in the co-existence working mode which has been scheduled but not been transmitted or transmission of which has been started but not been completed is resumed by utilizing timing relationship of the normal working mode corresponding to that of the co-existence working mode (corresponding time resource); typeIII is type III which indicates that during transition from the co-existence working mode to the normal working mode, a transition time is set, after which the user equipment may be allowed to enter the normal working mode. sf10, sf15, sf20, sf25, sf30, sf35, sf40 indicate 10 subframes, 15 subframes, 20 subframes, 30 subframes, 35 subframes, 40 subframes respectively; and GuardTime:(sf10, sf15, sf20, sf25, sf30, sf35, sf40) indicates that length of the transition time is 10 subframes, 15 subframes, 20 subframes, 30 subframes, 35 subframes, or 40 subframes.

The mode terminating completing message fed back by the user equipment to the base station may be carried by utilizing "RRCConnectionReconfigurationComplete".

If the base station does not allow the user equipment to terminate the co-existence working mode, the mode terminating response including information indicating to reject the user equipment to terminate the co-existence working mode may be carried by "RRCConnectionReject".

In another specific example, terminating of the co-existence working mode may be achieved by utilizing the added new RRC connection flow (RRC_CoEX_Termination). In this case, the mode terminating request (indicated by RRC_CoEX_Termination_Request) may include the following information:

RRC_CoEX_Termination_Request:
COEXTerm_request:(1)

wherein, COEXTerm_request indicates that the user equipment requests to terminate the co-existence working mode.

If the base station allows the user equipment to terminate the co-existence working mode, the mode terminating response (indicated by RRC_CoEX_Termination) may include one or more of the following information (when the base station needs to terminate the co-existence working mode, the mode terminating command may also employ the following format):

RRC_CoEX_Termination:
GuardMode:(None, typeI, typeII, typeIII, typeIV)
GuardTime:(sf10, sf15, sf20, sf25, sf30, sf35, sf40)

each of which is similar to that in the previous example and description thereof will not be repeated.

If the base station does not allow the user equipment to terminate the co-existence working mode, the mode terminating response (indicated by RRC_CoEX_termination_reject) may include the following information:

RRC_CoEX_termination_reject:
RetryDelayType:(sf10, sf15, sf20, sf25, sf30)

wherein, sf10, sf15, sf20, sf25, sf30 indicate 10 subframes, 15 subframes, 20 subframes, and 30 subframes respectively; and RetryDelayType:(sf10, sf15, sf20, sf25, sf30) indicates that the minimum time interval after which the next request for terminating the co-existence working mode is transmitted selected by the base station for the user equipment is 10 subframes, 15 subframes, 20 subframes, or 30 subframes.

Figure 13:
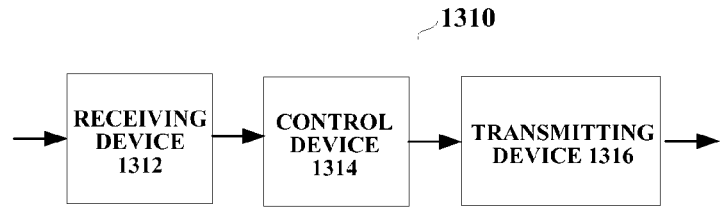
FIG. 13 is a block diagram illustrating a user equipment according to an embodiment of the disclosure.

FIG. 13 is a schematic block diagram illustrating a base station configured in a first communication system according to an embodiment of the disclosure.

As shown in FIG. 13, the base station 1310 may comprise a receiving device 1312, a control device 1314 and a transmitting device 1316.

The receiving device 1312 may receive various signaling and messages from a user equipment of the first communication system. The transmitting device 1316 may transmit various commands and messages to the user equipment. The control device 1314 may process the received various signaling and messages and generates signaling and messages to be transmitted to the user equipment according to related information.

The base station 1310 may execute the methods in the method embodiments/examples as described above with these devices.

For example, the base station 1310 may execute the method described with reference to FIG. 3. Specifically, the receiving device 1312 may receive a mode establishing request from the user equipment for establishing a co-existence working mode and transmit the request to the control device 1314. The control device 1314 may encapsulate configuration information indicating the co-existence working mode allowed to be utilized by the user equipment into an establishing response message and output it to the transmitting device 1316. The transmitting device 1316 transmits the establishing response message to the user equipment. The receiving device 1312 may also receive information indicating whether the user equipment has configured the co-existence working mode fed back from the user equipment.

For example, the base station 1310 may execute the method described with reference to FIG. 4. That is, the control device 1314 may also judges whether to allow the user equipment to enter the co-existence working mode according to system information of the first communication system (such as operation condition of current cell (such as current use condition of resources and the like) and/or working condition of the user equipment (such as current service of the user equipment and the like) and the like). If not, the control device 1314 encapsulates information for rejecting the user equipment to enter the co-existence working mode into the establishing response message; and if yes, encapsulates information for allowing the user equipment to enter the co-existence working mode into the establishing response message.

In an example, the control device 1314 may also select a co-existence working mode for the user equipment according to system information of the first communication system (such as operation condition of current cell (such as current use condition of resources and the like) and/or type and/or service of the interfering system and the like) and encapsulate configuration information of the selected co-existence working mode into the establishing response message.

In case that the mode establishing request sent by the user equipment includes information indicating the co-existence working mode recommended by the user equipment, the control device 1314 may also judge whether to allow the user equipment to use the recommended co-existence working mode. If so, information indicating to allow to use the recommended co-existence working mode into the establishing response message, otherwise, a co-existence working mode is selected according to system information of the first communication system (such as operation condition of current cell (such as current use condition of resources and the like) and/or type and/or service of the interfering system and the like).

The messages transmitted and received when the base station 1310 establishes a co-existence working mode may employ the contents, formats and transmission manners in the embodiments/examples as described above with reference to FIGS. 3-5 and 6A-6B. For example, the control device 1314 may also encapsulate information indicating start delay of the co-existence working mode into the establishing response message. For example, the control device 1314 may also encapsulate a transition time of the co-existence working mode into the establishing response message. For example, the establishing response message may be a RRC command. For example, in case that the user equipment is not allowed to enter a co-existence working mode, the control device 1314 may encapsulate information indicating the time interval after which the user equipment is allowed to request to establish a co-existence working mode next time into the establishing response message. Herein description thereof will not be repeated.

The base station 1310 may also execute the methods of re-configuring the co-existence working mode in the embodiments/examples as described above with reference to FIGS. 7 and 8.

In case that reconfiguration of the co-existence working mode is triggered by the user equipment, the receiving device 1312 may receive a reconfiguration request transmitted from the user equipment for re-configuring the co-existence working mode, the control device 1314 encapsulate reconfiguration information for re-configuring the co-existence working mode into a reconfiguration response message, and the transmitting device 1316 transmits the reconfiguration response message to the user equipment.

As an example, before generating the reconfiguration response message, the control device 1314 may also judge whether to allow the user equipment to re-configure the co-existence working mode. If not, information indicating to reject to re-configure the co-existence working mode is encapsulated into the reconfiguration response message; and if yes, reconfiguration information for re-configuring the co-existence working mode is encapsulated into the reconfiguration response message. As another example, the reconfiguration request transmitted by the user equipment includes information indicating variation of the second communication system, and the control device 1314 may select the configuration information or the reconfiguration information of the co-existence working mode according to the information indicating variation of the second communication system. In another example, the reconfiguration request transmitted by the user equipment includes reconfiguration information for re-configuring the co-existence working mode recommended by the user equipment according to variation of the second communication system (such as information indicating configuration of the co-existence working mode reselected by the user equipment according to variation of the second communication system), and the control device 1314 may judge whether to allow the user equipment to use the configuration information or the reconfiguration information of the recommended co-existence working mode according to system information.

In case that reconfiguration of the co-existence working mode is triggered by the base station, the receiving device 1312 may encapsulate reconfiguration information for re-configuring the co-existence working mode into a reconfiguration command which instructs the user equipment to re-configure the co-existence working mode, and the transmitting device 1316 transmits the reconfiguration command to the user equipment. The receiving device may receive the acknowledge signal indicating that the reconfiguration has been completed fed back from the user equipment.

The messages transmitted and received when the base station 1310 re-configures the co-existence working mode may employ the contents, formats and transmission manners in the embodiments/examples as described above with reference to FIGS. 7 and 8, description of which will not be repeated herein.

The base station 1310 may also execute the methods of suspending and restarting the co-existence working mode in the embodiments/examples as described above with reference to FIGS. 9 and 10.

Specifically, the control device 1314 may generate a suspending command for instructing the user equipment to suspend the co-existence working mode, which may include information indicating start time of suspending the co-existence working mode. The transmitting device 1316 transmits the suspending command to the user equipment, and the receiving device 1312 receives a suspending completing message indicating that the co-existence working mode has been suspended fed back by the user equipment.

In an example, in addition to start time or start delay of suspending the co-existence working mode, the suspending command may include restart time of restart delay of restarting the co-existence working mode, and the user equipment can restart the co-existence working mode at a specified time according to the command (not shown) without the base station 1310 (the control device 1314) generating and transmitting a restart command.

In another example, the control device 1314 may also generates a restart command for instructing the user equipment to restart the co-existence working mode, which includes information indicating restart time of restarting the co-existence working mode. The transmitting device 1316 transmits the restart command to the user equipment. The receiving device 1312 receives a restart completing message indicating that the co-existence working mode has been restarted fed back by the user equipment.

The messages transmitted and received when the base station 1310 suspends and restarts the co-existence working mode may employ the contents, formats and transmission manners in the embodiments/examples as described above with reference to FIGS. 9 and 10, description of which will not be repeated herein.

The base station 1310 may also execute the method of terminating the co-existence working mode in the embodiments/examples as described above with reference to FIGS. 11 and 12.

In case that the user equipment terminates the co-existence working mode, the receiving device 1312 may receive a mode terminating request for terminating the co-existence working mode transmitted by the user equipment. The control device 1314 judges whether to allow to terminate the co-existence working mode according to system information, and the transmitting device 1316 feeds back information indicating whether to allow to terminate the co-existence working mode to the user equipment.

In case that the base station terminates the co-existence working mode, the transmitting device 1316 transmits a mode terminating command instructing to terminate the co-existence working mode to the user equipment.

The messages transmitted and received when the base station 1310 terminates the co-existence working mode may employ the contents, formats and transmission manners in the embodiments/examples as described above with reference to FIGS. 11 and 12, description of which will not be repeated herein.

Figure 14:
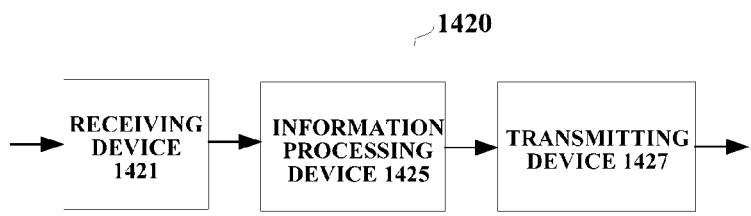
FIG. 14 is a block diagram illustrating a base station according to an embodiment of the disclosure.

FIG. 14 is a schematic block diagram illustrating a user equipment configured in a first communication system according to an embodiment of the disclosure.

As shown in FIG. 14, the base station 1420 may comprise a receiving device 1421, an information processing device 1425 and a transmitting device 1427.

The receiving device 1421 may receive various signaling and messages from a base station of the first communication system. The transmitting device 1427 may transmit various commands and messages to the base station. The information processing device 1425 may process the received various signaling and messages and generates signaling and messages to be transmitted to the base station according to related information.

The user equipment 1420 may execute the methods in the method embodiments/examples as described above with these devices.

For example, the user equipment 1420 may execute the method described with reference to FIG. 2. Specifically, the information processing device 1425 may generate a mode establishing request for establishing a co-existence working mode. The transmitting device 1427 may transmit the mode establishing request to the base station, and the receiving device may receive an establishing response message fed back by the base station, which includes configuration information indicating the co-existence working mode allowed by the base station to be utilized by the user equipment. The information processing device 1425 may configure the co-existence working mode according to the configuration information in the response message to start the co-existence working mode. After configuring the co-existence working mode, the transmitting device 1427 may also feed back information indicating whether the user equipment has configured the co-existence working mode to the base station.

For example, the user equipment 1420 may execute the method described with reference to FIG. 5. Specifically, after the receiving device 1421 receives the establishing response message, the information processing device 1425 may first judge whether the base station allows the user equipment to enter the co-existence working mode according to the establishing response message. If so, the information processing device 1425 may configure the co-existence working mode according to the configuration information in the response message to start the co-existence working mode; otherwise, do not start the co-existence working mode.

After the information processing device 1425 configures the co-existence working mode, the transmitting device 1427 may also feed back information indicating that configuration of the co-existence working mode has been completed to the base station.

As an example, the information processing device 1425 may also select a co-existence working mode according to the detected interfering system (the second communication system) and encapsulate information indicating the selected co-existence working mode into the mode establishing request. As another example, the information processing device 1425 may also encapsulate information indicating type and/or service of the second communication system into the mode establishing request. In some examples, the transmitting device may transmit the mode establishing request with PUCCH, MAC layer, or RRC layer. When the establishing response information fed back by the base station includes information indicating start delay of the co-existence working mode, the information processing device 1425 may also determine start time of the co-existence working mode according to the start delay. When the establishing response information received by the receiving device 1421 also includes information indicating transition time of the co-existence working mode, the information processing device 1425 may obtain the transition time by analyzing the information and judge whether there is a need for transition time accordingly. In this way, the user equipment 1420 continues to transmit data by utilizing previous working mode during the transition time after entering the co-existence working mode and continues to transmit data by utilizing the co-existence working mode during the transition time after terminating the co-existence working mode. The messages transmitted and received when the user equipment 1420 establishes a co-existence working mode may employ the contents, formats and transmission manners in the embodiments/examples as described above with reference to FIGS. 3-5 and 6A-6B. Herein description thereof will not be repeated.

The user equipment 1420 may also execute the methods of re-configuring the co-existence working mode in the embodiments/examples as described above with reference to FIGS. 7 and 8.

In case that reconfiguration of the co-existence working mode is triggered by the user equipment 1420, the information processing device 1425 may generate a reconfiguration request for re-configuring the co-existence working mode, and the transmitting device 1427 transmits the reconfiguration request to the base station. The receiving device 1421 receives a reconfiguration response message including reconfiguration information for re-configuring the co-existence working mode fed back by the base station, and the information processing device 1425 changes the co-existence working mode according to the reconfiguration information.

As an example, before generating the reconfiguration response message, the control device 1314 may also judge whether to allow the user equipment to re-configure the co-existence working mode. If not, information indicating to reject to re-configure the co-existence working mode is encapsulated into the reconfiguration response message; and if yes, reconfiguration information for re-configuring the co-existence working mode is encapsulated into the reconfiguration response message. As another example, the reconfiguration request transmitted by the user equipment includes information indicating variation of the second communication system, and the control device 1314 may select reconfiguration information for re-configuring the co-existence working mode according to the information indicating variation of the second communication system (such as configuration information of the co-existence working mode reselected according to variation of the second communication system). In another example, the reconfiguration request transmitted by the user equipment includes configuration information or reconfiguration information of the co-existence working mode which is recommended by the user equipment according to variation of the second communication system, and the control device 1314 may judge whether to allow the user equipment to use the configuration information or the reconfiguration information of the recommended co-existence working mode according to system information.

In an example, after the receiving device 1421 receives the reconfiguration response message, the information processing device 1425 may first judge whether the base station allows to re-configure the co-existence working mode according to the reconfiguration response message. If so, the co-existence working mode is re-configured, otherwise, is not re-configured.

In another example, the information processing device 1425 may also encapsulate the information indicating variation of the second communication system into the reconfiguration request. In another example, the information processing device 1425 may also reselect configuration information of the co-existence working mode according to variation of the second communication system, and encapsulate the information into the reconfiguration request.

In case that reconfiguration of the co-existence working mode is triggered by the base station, the receiving device 1421 receives a reconfiguration command for instructing to re-configure the co-existence working mode transmitted from the base station, which includes reconfiguration information for re-configuring the co-existence working mode. The information processing device 1425 re-configures the co-existence working mode according to the reconfiguration information, and the transmitting device feeds back a acknowledge signal indicating that the reconfiguration has been completed to the base station after completing the reconfiguration.

The messages transmitted and received when the user equipment 1420 re-configures the co-existence working mode may employ the contents, formats and transmission manners in the embodiments/examples as described above with reference to FIGS. 7 and 8, description of which will not be repeated herein.

The user equipment 1420 may also execute the methods of suspending and restarting the co-existence working mode in the embodiments/examples as described above with reference to FIGS. 9 and 10.

Specifically, the receiving device 1421 receives a suspending command for instruct to suspend the co-existence working mode transmitted from the base station, which includes information indicating start time of suspending the co-existence working mode. The information processing device suspends the co-existence working mode according to the suspending command.

In an example, in addition to start time or start delay of suspending the co-existence working mode, the suspending command may include restart time of restart delay of restarting the co-existence working mode, and the user equipment 1420 (the information processing device 1425) can restart the co-existence working mode at a specified time according to the command without the base station 1310 generating and transmitting a restart command.

In another example, the receiving device 1421 receives a restart command for instructing to restart the co-existence working mode transmitted from the base station, which includes information indicating restart time of restarting the co-existence working mode. The information processing device 1425 restarts the co-existence working mode according to the restart command.

After the suspending operation is completed, the transmitting device 1427 may feed back a suspending completing message indicating that the co-existence working mode has been suspended to the base station. After the restart operation is completed, the transmitting device 1427 may feed back a restart completing message indicating that the co-existence working mode has been restarted to the base station.

The messages transmitted and received when the user equipment 1420 suspends and restarts the co-existence working mode may employ the contents, formats and transmission manners in the embodiments/examples as described above with reference to FIGS. 9 and 10, description of which will not be repeated herein.

The user equipment 1420 may also execute the method of terminating the co-existence working mode in the embodiments/examples as described above with reference to FIGS. 11 and 12.

In case that the user equipment 1420 trigger the flow for terminating the co-existence working mode, the information processing device 1425 may generate a mode terminating request for terminating the co-existence working mode, and the transmitting device 1427 transmits the mode terminating request to the base station. The receiving device 1421 receives information indicating whether to allow to terminate the co-existence working mode fed back from the base station. The information processing device 1425 judges whether to terminate the co-existence working mode according to the information fed back by the base station.

In case that the base station trigger the flow for terminating the co-existence working mode, the receiving device 1421 receives a mode terminating command instructing to terminate the co-existence working mode transmitted from the base station. The information processing device 1425 terminates the co-existence working mode according to the terminating command.

The messages transmitted and received when the user equipment 1420 terminates the co-existence working mode may employ the contents, formats and transmission manners in the embodiments/examples as described above with reference to FIGS. 11 and 12, description of which will not be repeated herein.

The embodiments of the disclosure also provide a communication system comprising the base station and the user equipment as described above.

It shall be understood by those skilled in the art that various embodiments and/or examples described herein are exemplary and not exhaustive, and the disclosure is not limited to these embodiments and/or examples.

In above embodiments and/or examples, the first communication system and the second communication system refer to different communication systems existing in a user equipment. For example, the first communication system may be a LTE system, a LTE-A system, or other communication system, while the second communication system (the interfering system) may be a Bluetooth system, a WLAN system of a GPS system configured in the user equipment. Herein not all the cases will be listed.

In the specification, terms "first", "second", etc. are only for distinguishing the features described by them literally in order to illustrate the disclosure in a manner of clarity. Therefore, it shall not deem them to have any limited meaning.

As an example, various steps of the above methods and various component modules and/or units of the above apparatuses may be configured by software, firmware, hardware or their combination thereof in a base station (such as eNodeB) or a terminal node of the first communication system, and are parts of the corresponding apparatuses of the base station or the terminal node. Specific means and manners that may be used by the configuration are well known to those skilled in the art, and details are omitted here.

It is readily understood that system comprising the apparatuses of the above embodiments shall also fall in the scope of protection of the disclosure.

Figure 15:
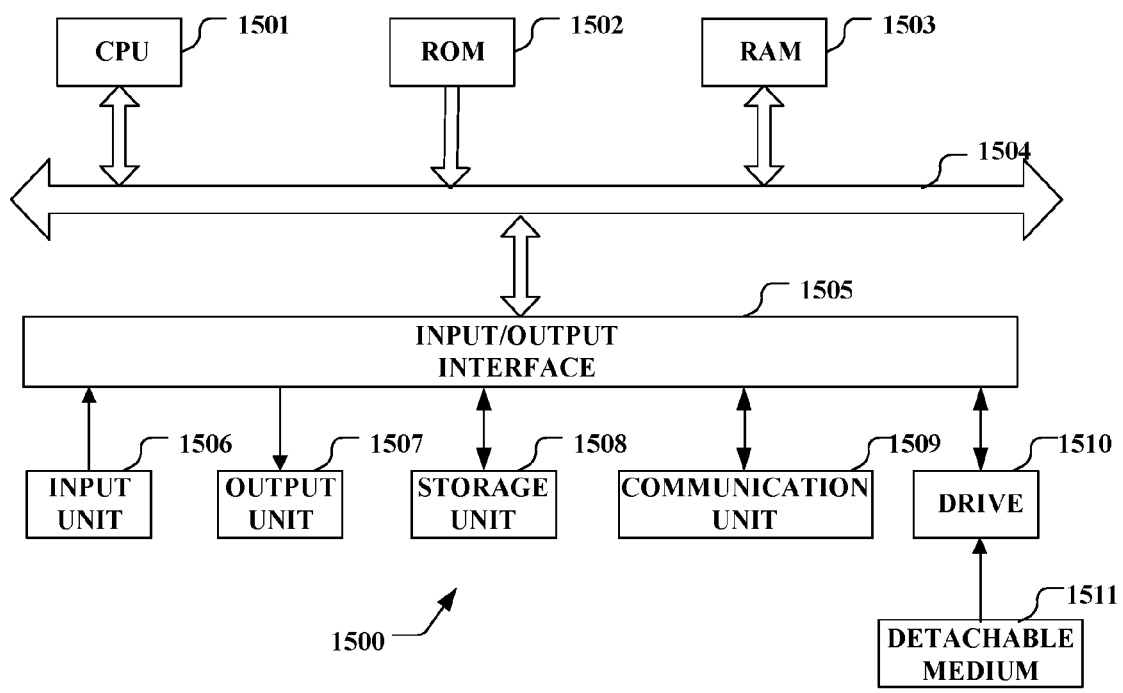
FIG. 15 is an example block diagram illustrating a structure of computer for implementing the methods and apparatuses according to the disclosure.

As an example, in case of implementing by software or firmware, program constituting the software may be mounted to a computer having a dedicated hardware structure from a storage medium or network (for example, the universal computer 1500 as illustrated in FIG. 15), when the computer is mounted with various program, the computer may execute various functions.

In FIG. 15, a central processing unit (CPU) 1501 perform various processes according to the program stored in the Read-Only Memory (ROM) 1502 or programs loaded from the storage unit 1508 to the Random Access Memory (RAM) 1503. In the RAM 1503, store also data required when the CPU 1501 performs various processes. CPU 1501, ROM 1502 and RAM 1503 are connected from one to another via bus 1504. Input/output interface 1505 is also connected to the bus 1504.

The following components are connected to the input/output interface 1505: input unit 1506 (including keyboard, mouse, etc.); output unit 1507 (including display, such as cathode ray tube (CRT), liquid crystal display (LCD), etc., and speakers and so on); storage unit 1508 (including hard disc, etc.); and communication part 1509 (including network interface cards such as LAN cards, modems and so on). The communication unit 1509 performs communication process via network like the internet. According to requirements, drive 1510 is also connected to the input/output interface 1505. Detachable medium 1511 such as magnetic disc, CD, magneto-optical disc, semiconductor memory, and so on is installed on the drive 1510 based on requirements, such that the computer program read out therefrom is installed in the storage unit 1508 based on requirements.

In case of implementing the above processes by software, programs constituting the software are installed from a network like the Internet or from a storage medium like the detachable medium 1511.

Those skilled in the art should understand that such storage medium is not limited to the detachable medium 1511 which is stored with programs and distributes separate from the method to provide a user with program as illustrated in FIG. 15. The example of the detachable medium 1511 includes disc (including floppy disc (registered marks)), CD (including CD read only memory (CD-ROM) and digital versatile disc (DVD)), magneto-optical disc (including mini-disc (MD) (registered marks)) and semiconductor memory. Alternatively, the storage medium may be ROM 1502, or hard disc included in the storage unit 1508 in which a program is stored and the program is distributed to a user with the method including the same.

The disclosure also provides a program product storing machine readable instruction code. When read and executed by a machine, the instruction code may implement the method according to the embodiment of the disclosure.

Correspondingly, a storage medium for carrying the program code storing the machine readable instruction code is also included in the disclosure. The storage medium includes, but not limited to, Floppy disk, CD-ROMs, magneto-optical disk, memory card, memory stick, etc.

In the above description of the specific embodiments, features described and/or shown for one embodiment may be used in one or more other embodiments in the same or similar manner, combined with features in other embodiments, or replaced with features in other embodiments.

In addition, the present disclosure includes but is not limited to the following configurations.

Item 1. A method for solving the co-existence problem, comprising:

pre-configuring the information for co-existence working mode by a base station of a first communication system for a user equipment, receiving, by the base station of the first communication system from the user equipment in the first communication system, a mode establishing request for indicating the co-existence problem experienced by the user equipment and providing the assistance information for co-existence working mode in which the user equipment performs a first communication with the base station and performs a second communication with an apparatus in a second communication system which is different from the first communication system in a time-division manner.

Item 2. The method of item 1, further comprising:

encapsulating, by the base station, configuration information of a co-existence working mode allowed to be utilized by the user equipment into an establishing response message, and transmitting the establishing response message to the user equipment; and receiving, by the base station, a message indicating whether configuration of the co-existence working mode has been completed fed back from the user equipment.

Item 3. The method of item 2, further comprising:

judging, by the base station, whether to allow the user equipment to enter the co-existence working mode according to operation condition of the first communication system, and if no, encapsulating information indicating to reject the user equipment to enter the co-existence working mode into the establishing response message.

Item 4. The method of item 1, further comprising:

selecting, by the base station, the co-existence working mode allowed to be utilized by the user equipment according to operation condition of the first communication system.

Item 5. The method of item 4, wherein the mode establishing request comprises information indicating a co-existence working mode selected by the user equipment, and the method further comprises:

judging, by the base station, whether to allow the user equipment to utilize the co-existence working mode selected by the user equipment according to the operation condition of the first communication system, and if yes, encapsulating into the establishing response message information indicating the co-existence working mode selected by the user equipment is allowed to be utilized.

Item 6. A method for solving the co-existence problem, comprising:

receiving, by a user equipment of a first communication system from a base station in the first communication system, the information for co-existence working mode;

transmitting, by the user equipment of the first communication system to the base station in the first communication system, a mode establishing request for indicating the co-existence problem experienced by the user equipment and providing the assistance information for co-existence working mode in which the user equipment performs a first communication with the base station and performs a second communication with an apparatus in a second communication system which is different from the first communication system in a time-division manner.

Item 7. The method of item 6, further comprising:

receiving, by the user equipment from the base station, an establishing response message comprising configuration information of a co-existence working mode allowed to be utilized by the user equipment;

configuring the co-existence working mode according to the configuration information; and feeding back, by the user equipment to the base station, a message indicating whether configuration of the co-existence working mode has been completed.

Item 8. The method of item 7, further comprising:

judging, by the user equipment, whether the base station allows the user equipment to enter the co-existence working mode according to the establishing response message.

Item 9. The method of item 6, further comprising:

selecting, by the user equipment, a co-existence working mode according to the second communication system; and encapsulating information of the selected co-existence working mode into the mode establishing request.

Item 10. The method of item 6, further comprising:

encapsulating, by the user equipment, information indicating a type and/or service of the second communication system into the mode establishing request.

Item 11. A base station, configured in a first communication system, comprising:

a control device, configured to pre-configure the information for co-existence working mode;

a receiving device, configured to receive, from a user equipment in the first communication system, a mode establishing request for indicating the co-existence problem experienced by the user equipment and providing the assistance information for co-existence working mode in which the user equipment performs a first communication with the base station and performs a second communication with an apparatus in a second communication system which is different from the first communication system in a time-division manner.

Item 12. The base station of item 11, further comprising:

a control device, configured to encapsulate configuration information of a co-existence working mode allowed to be utilized by the user equipment into an establishing response message; and a transmitting device, configured to transmit the pre-configured information for co-existence working mode and the establishing response message to the user equipment, wherein the receiving device is further configured to receive a message indicating whether configuration of the co-existence working mode has been completed fed back from the user equipment.

Item 13. The base station of item 12, wherein the control device is further configured to:

judge whether to allow the user equipment to enter the co-existence working mode according to operation condition of the first communication system, and if no, encapsulate information indicating to reject the user equipment to enter the co-existence working mode into the establishing response message.

Item 14. The base station of item 11, wherein:

the receiving device is further configured to receive, from the user equipment, a reconfiguration request for requesting to re-configure the co-existence working mode, the control device is further configured to encapsulate reconfiguration information for re-configuring the co-existence working mode into a reconfiguration response message, and the transmitting device is further configured to transmit the reconfiguration response message to the user equipment.

Item 15. The base station of item 11, wherein:

the control device is further configured to encapsulate reconfiguration information for re-configuring the co-existence working mode into a reconfiguration command instructing the user equipment to re-configure the co-existence working mode, the transmitting device is further configured to transmit to the user equipment the reconfiguration command, and the receiving device is further configured to receive a reply signal indicating whether reconfiguration of the co-existence working mode has been completed fed back from the user equipment.

Item 16. A user equipment configured in a first communication system, comprising:

a receiving device, configured to receive the pre-configured information for co-existence working mode from a base station in the first communication system;

an information processing device, configured to generate a mode establishing request for indicating the co-existence problem experienced by the user equipment and providing the assistance information for co-existence working mode in which the user equipment performs a first communication with a base station of the first communication system and performs a second communication with an apparatus in a second communication system which is different from the first communication system in a time-division manner;

a transmitting device, configured to transmit the mode establishing request to the base station in the first communication system.

Item 17. The user equipment of item 16, further comprising:

a receiving device, configured to receive, from the base station, an establishing response message comprising configuration information of a co-existence working mode allowed to be utilized by the user equipment, wherein the information processing device is further configured to configure the co-existence working mode according to the configuration information; and the transmitting device is further configured to feed back, to the base station, a message indicating whether configuration of the co-existence working mode has been completed.

Item 18. The user equipment of item 17, wherein the information processing device is further configured to:

judge whether the base station allows the user equipment to enter the co-existence working mode according to the establishing response message.

Item 19. The user equipment of item 16, wherein:

the information processing device is further configured to generate a reconfiguration request for requesting to re-configure the co-existence working mode, the transmitting device is further configured to transmit the reconfiguration request to the base station, the receiving device is further configured to receive, from the base station, a reconfiguration response message comprising reconfiguration information for re-configuring the co-existence working mode, and the information processing device is further configured to re-configure the co-existence working mode according to the reconfiguration information.

Item 20. A communication system, comprising the base station according to item 11 and the user equipment according to item 16.

It shall be emphasized that the technical term "comprise/include" is used here to refer to an existence of a feature, an element, a step or a component, without excluding existences or attachments of one or more other features, elements, steps or components.

In addition, the method of embodiments of the disclosure is not limited to be executed in the temporal order described in the Description or shown in the Figures, and may be executed in other temporal order in parallel or independently. Therefore, the execution order of the method described in the Description does not limit the technical range of the disclosure.

Although embodiments of the disclosure have been described in detail by combining with the Figure, it shall be understood that the embodiments described above are only used to illustrate the disclosure, and do not limit the disclosure. For those skilled in the art, the embodiments may be changed in various manners without departing from the substance and scope of the disclosure. Therefore, the scope of the disclosure is only defined by the attached claims and its equivalent meanings.

What is claimed is:

1. A user equipment that communicates with a base station in a first communication system, comprising:

a transmitter configured to transmit to the base station an indication to report a co-existence problem experienced by the user equipment and to also transmit assistance information for a co-existence working mode in which the user equipment performs a first communication with the base station and performs a second communication with an apparatus in a second communication system;

a receiver configured to receive from the base station configuration information that include information of a co-existence working mode allowed to be utilized by the user equipment and information that indicates whether the user equipment can deny an uplink transmission of the first communication system and a message; and a processor configured to configure the co-existence working mode according to the configuration information.

* * * * *